United States Patent
Choi et al.

(10) Patent No.: US 7,969,926 B2
(45) Date of Patent: Jun. 28, 2011

(54) SYSTEM AND METHOD FOR TRANSMITTING/RECEIVING SIGNAL IN A COMMUNICATION SYSTEM

(75) Inventors: Jin-Ghoo Choi, Seoul (KR); Sung-Yoon Jung, Seoul (KR); Seong-Lyun Kim, Seoul (KR); Kwang-Soon Kim, Seoul (KR); Young-Jin Sang, Seoul (KR); Jung-Min Park, Busan (KR); Young-Ju Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 12/200,824

(22) Filed: Aug. 28, 2008

(65) Prior Publication Data

US 2009/0059819 A1    Mar. 5, 2009

(30) Foreign Application Priority Data

Aug. 31, 2007  (KR) .......................... 10-2007-0088574

(51) Int. Cl.
*H04B 7/14* (2006.01)
(52) U.S. Cl. ......... 370/315; 370/330; 370/342; 370/441
(58) Field of Classification Search .................. 370/208, 370/310, 315, 328, 329, 330, 342, 355, 441
See application file for complete search history.

(56) References Cited

U.S. PATENT DOCUMENTS

| | | | |
|---|---|---|---|
| 5,920,819 A * | 7/1999 | Asanuma ...................... 455/447 |
| 6,335,924 B1 * | 1/2002 | Yano et al. ..................... 370/335 |
| 6,587,444 B1 * | 7/2003 | Lenzo et al. ................... 370/330 |
| 2004/0192204 A1 * | 9/2004 | Periyalwar et al. ............. 455/25 |
| 2004/0252659 A1 * | 12/2004 | Yun et al. ...................... 370/328 |
| 2006/0077931 A1 * | 4/2006 | Lee et al. ....................... 370/329 |
| 2006/0126546 A1 * | 6/2006 | Lee et al. ....................... 370/310 |
| 2006/0193280 A1 * | 8/2006 | Lee et al. ....................... 370/315 |
| 2006/0209671 A1 * | 9/2006 | Khan et al. .................... 370/208 |

* cited by examiner

*Primary Examiner* — Andrew Lai
(74) *Attorney, Agent, or Firm* — Jefferson IP Law, LLP

(57) ABSTRACT

A system and method for transmitting and receiving signals in a communication system are provided, in which a BS communicates with a first MS located within an inner area of a cell during first and second time periods in TDD and communicates with a second MS located within an outer area of the cell during the first time period in FDD, and an RS detects signals transmitted between the BS and the second MS during the first time period and transmits the detected signals simultaneously to the BS and the second MS during the second time period.

16 Claims, 23 Drawing Sheets

SYSTEM AND METHOD FOR TRANSMITTING/RECEIVING SIGNAL IN A COMMUNICATION SYSTEM

PRIORITY

This application claims the benefit under 35 U.S.C. §119 (a) of a Korean patent application filed in the Korean Intellectual Property Office on Aug. 31, 2007 and assigned Serial No. 2007-88574, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd., and the Industry-Academic Cooperation Foundation, Yonsei University.

BACKGROUND OF THE INVENTION

1. Field of the Invention

The present invention relates to a communication system. More particularly, the present invention relates to a system and method for transmitting/receiving a signal in a communication system.

2. Description of the Related Art

In a conventional communication system, a transmitter and a receiver communicate with each other using one of Time Division Duplexing (TDD), Frequency Division Duplexing (FDD), Hybrid Duplexing (HDD) and the like. HDD uses TDD and FDD in combination.

Relay Stations (RSs) can be used to expand service coverage as well as increase a data rate in the communication system. That is, a Mobile Station (MS) transmits and receives signals to and from a Base Station (BS) directly or via an RS connected to multi-hop nodes.

The signals transmitted directly between the MS and the BS may be asynchronous to those transmitted between the MS and the BS via the RS. The synchronization mismatch causes inter-carrier interference.

Since the communication system distributes limited resources to multiple cells, interference may occur between neighbor cells. More particularly, in an HDD communication system that is not employing frequency reuse, an MS at a cell boundary is vulnerable to interference from a BS within a neighbor cell or from an MS communicating with the BS within the neighbor cell. As a consequence, overall system performance is degraded.

SUMMARY OF THE INVENTION

An aspect of the present invention is to address at least the above-mentioned problems and/or disadvantages and to provide at least the advantages described below. Accordingly, an aspect of the present invention is to provide a system and method for transmitting/receiving a signal in order to reduce neighbor cell interference in a communication system.

Another aspect of the present invention is to provide a system and method for transmitting/receiving a signal using frequency reuse in a communication system.

In accordance with an aspect of the present invention, a system for transmitting and receiving signals in a communication system is provided. The system includes a BS that communicates with a first MS located within an inner area of a cell during first and second time periods in TDD and communicates with a second MS located within an outer area of the cell during the first time period in FDD, and an RS detects signals transmitted between the BS and the second MS during the first time period and transmits the detected signals simultaneously to the BS and the second MS during the second time period.

In accordance with another aspect of the present invention, a method for transmitting and receiving signals in a communication system is provided. The method includes a first MS located within an inner area of a cell that communicates with a BS during first and second time periods in TDD, a second MS located within an outer area of the cell communicates with the BS during the first time period in FDD, signals transmitted between the BS and the second MS are detected during the first time period by an RS, and the detected signals are simultaneously transmitted to the BS and the second MS during the second time period by the RS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A brief description will be made of first, second and third duplexing schemes according to an exemplary embodiment of the present invention.

In the first duplexing scheme, communications between a Mobile Station (MS) and a Base Station (BS) within an inner cell area and communications between a Relay Station (RS) and the BS within the inner cell area are based on Time Division Duplexing (TDD). That is, the MS, the RS and the BS transmit/receive signals in a first or second time-divided sub-frequency band.

In the second duplexing scheme, an MS in an outer cell area communicates with the BS using Frequency Division Duplexing (FDD). That is, the MS and the BS transmit/receive in a DownLink (DL) band of the first sub-frequency band and in an UpLink (UL) band of the second sub-frequency band.

In the third duplexing scheme, when the BS communicates with the MS within the outer cell area according to the second duplexing scheme, the RS detects signals transmitted between the BS and the MS and transmits them to the BS and the MS simultaneously.

More specifically, when the BS transmits a DL signal to the MS in the DL band of the first sub-frequency band and the MS transmits an UL signal to the BS in the UL band of the second sub-frequency band, the RS detects the DL signal and the UL signal at the same time. Then the RS combines the DL and UL signals and simultaneously transmits the combined signal to the MS and the BS in the first or second sub-frequency band.

Now a description will be made of a Hybrid Duplexing (HDD) communication system according to an exemplary embodiment of the present invention with reference to FIG. 1.

Figure 1:
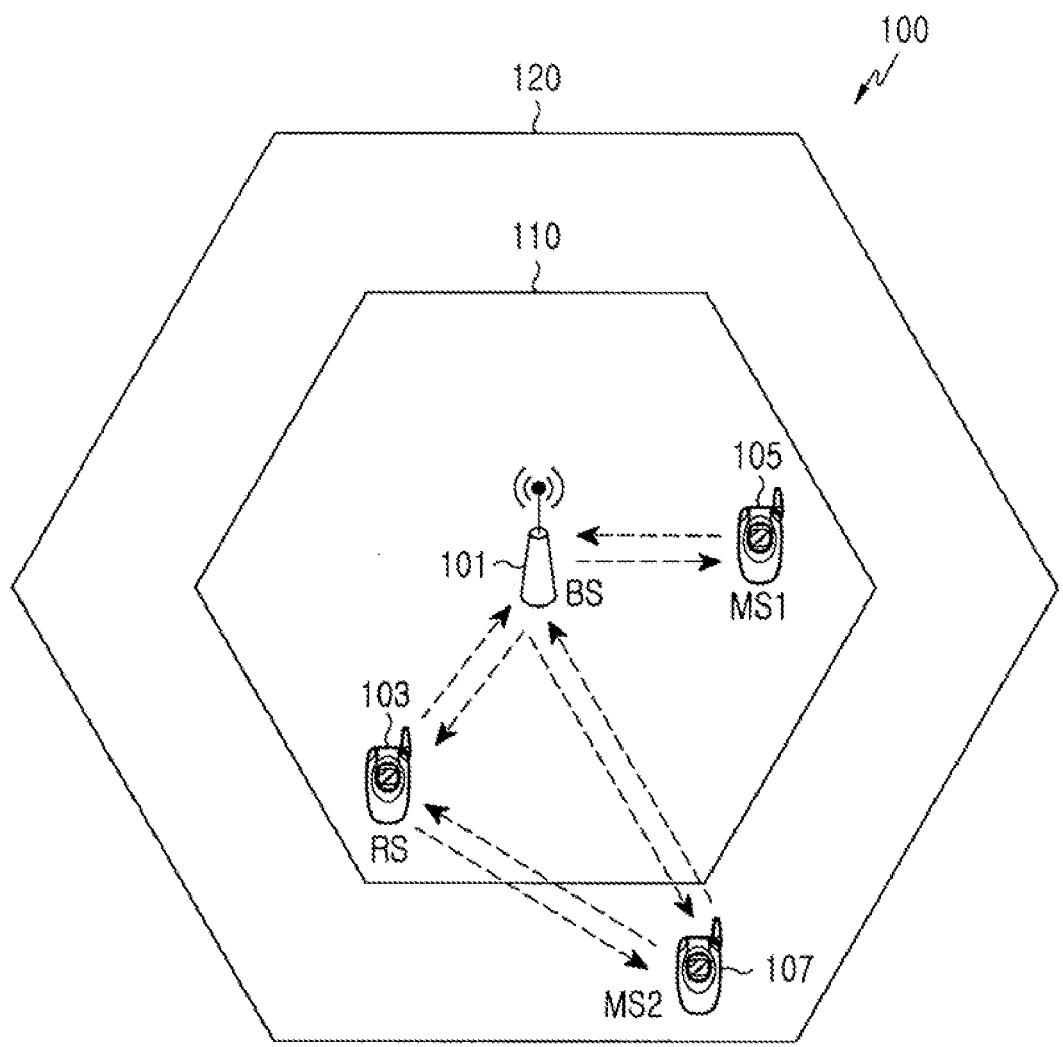
FIG. 1 illustrates a Hybrid Duplexing (HDD) communication system according to an exemplary embodiment of the present invention.

FIG. 1 illustrates an HDD communication system according to an exemplary embodiment of the present invention.

Referring to FIG. 1, a cell 100 is divided into an inner area 110 and an outer area 120 in the HDD communication system. The HDD communication system includes a BS 101 and a first MS 105 (MS 1) within the inner area 110, and a second MS 107 (MS 2) and an RS 103 for relaying signals between MS 2 and the BS 101 within the outer area 120.

While the RS 103 may additionally function as an MS, it is assumed herein that the RS 103 is dedicated to an RS function, i.e. a decoding and forward function without the MS function.

The BS 101 and MS 1 communicate with each other according to the first duplexing scheme. That is, the BS 101 transmits a signal to MS 1 in a first sub-frequency band during a first time period and MS 1 transmits a signal to the BS 101 in the first sub-frequency band during a second time period. While it has been described that the TDD communications between the BS 101 and MS 1 take place in the first sub-frequency band, the first sub-frequency band can be replaced by the second sub-frequency band.

The BS 101 communicates with MS 2 according to the second duplexing scheme. That is, during the first time period, the BS 101 transmits a DL signal to MS 2 in a DL band of the first frequency band and MS 2 transmits an UL signal to the BS 101 in an UL band of the second sub-frequency band.

During the signal transmission/reception between the BS 101 and MS 2 the first time period according to the second duplexing scheme, the RS 103 detects the DL signal from the BS 101 and the UL signal from MS 2 according to the third duplexing scheme and simultaneously transmits the detected signals to the BS 101 and MS 2 during the second time period. That is, the RS 103 detects the DL signal directed from the BS 101 to MS 2 and the UL signal directed from MS 2 to the BS 101 during the first time period. The RS 103 combines the detected DL and UL signals. Then, the RS 103 simultaneously transmits the combined signal to the BS 101 and MS 2 in part of the first or second sub-frequency bands.

Meanwhile, frequencies are allocated by Reuse Partitioning (RP) or Partial Frequency Reuse (PFR) in the inner area 110 and the outer area 120.

Figure 2:
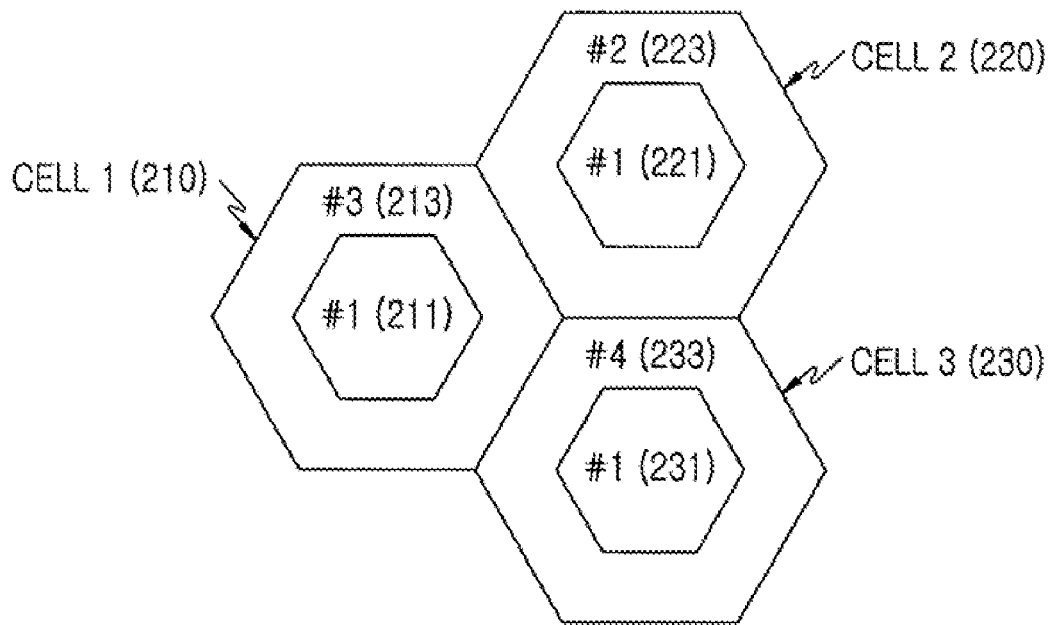
FIG. 2 illustrates a Reuse Partitioning (RP) based frequency reuse method in a communication system according to an exemplary embodiment of the present invention.

With reference to FIG. 2, an RP-based frequency reuse method in a communication system according to an exemplary embodiment of the present invention will be described below.

FIG. 2 illustrates an RP-based frequency reuse method in a communication system according to an exemplary embodiment of the present invention.

Referring to FIG. 2, RP is a frequency reuse scheme in which a total frequency band is divided into, for example, four sub-frequency bands, a first sub-frequency band 201 is allocated to inner areas 211, 221, and 231 of cells 210, 220 and 230 (Cell 1, Cell 2 and Cell 3), and third, second and fourth sub-frequency bands 205, 203 and 207 are allocated to outer areas 213, 223 and 233 of Cell 1, Cell 2, and Cell 3, respectively.

More specifically, an MS and a BS within the inner area 211 of Cell 1 communicate with each other in the first sub-frequency band 201, and the BS communicates with an MS within the outer area 213 of Cell 1 in the third sub-frequency band 205.

A BS communicates with an MS within the inner area 221 of Cell 2 in the first sub-frequency band 201, and with an MS within the outer area 223 of Cell 2 in the second sub-frequency band 203.

A BS communicates with an MS within the inner area 231 of Cell 3 in the first sub-frequency band 201, and with an MS within the outer area 233 of Cell 3 in the fourth sub-frequency band 207.

That is, the RP scheme allows signal transmission/reception between MSs and BSs within the inner areas 211, 221 and 231 of Cell 1, Cell 2 and Cell 3 in the first sub-frequency band 201 and allows signal transmission/reception between the BSs and MSs within the outer areas 213, 223 and 233 of Cell 1, Cell 2 and Cell 3 in the second, third and fourth sub-frequency bands 203, 205 and 207.

Figure 3:
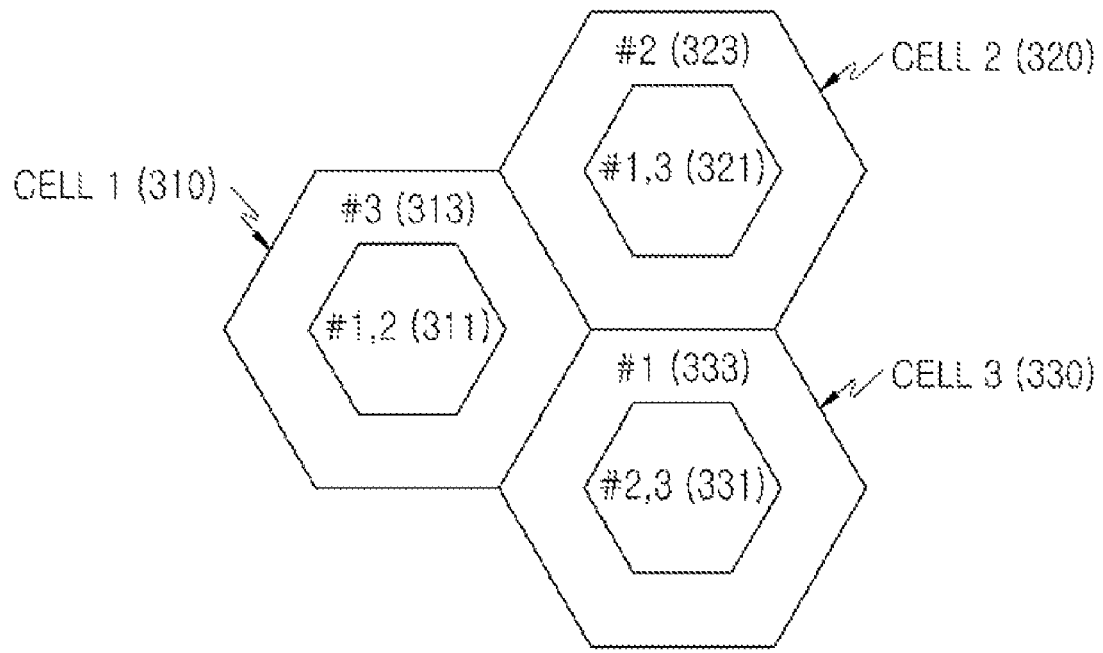
FIG. 3 illustrates a Partial Frequency Reuse (PFR) based frequency reuse method in a communication system according to an exemplary embodiment of the present invention.

With reference to FIG. 3, a PFR-based frequency reuse method in a communication system according to an exemplary embodiment of the present invention will be described below.

FIG. 3 illustrates a PFR-based frequency reuse method in a communication system according to an exemplary embodiment of the present invention.

Referring to FIG. 3, PFR is a frequency reuse scheme in which a total frequency band is divided into, for example, three sub-frequency bands 301, 303 and 305, a different sub-frequency band is allocated to each of outer areas 313, 323, and 333 of cells 310, 320 and 330 (Cell 1, Cell 2 and Cell 3), and the other sub-frequency bands except the sub-frequency band allocated to the outer area 313, 323 or 333 are allocated to the inner area 311, 321 or 331 of each cell.

More specifically, a BS communicates with an MS within the outer area 313 of Cell 1 in the third sub-frequency band 305, and the BS communicates with an MS within the inner area 311 of Cell 1 in the first and second sub-frequency bands 301 and 303.

A BS communicates with an MS within the outer area 323 of Cell 2 in the second sub-frequency band 303, and the BS communicates with an MS within the inner area 321 of Cell 2 in the first and third sub-frequency bands 301 and 305.

A BS communicates with an MS within the outer area 333 of Cell 3 in the first sub-frequency band 301, and the BS communicates with an MS within the inner area 331 of Cell 3 in the second and third sub-frequency bands 303 and 305.

That is, the PFR scheme allows signal transmission/reception between the BS and an MS within the outer area 313, 323 or 333 of each of Cell 1, Cell 2 and Cell 3 in one of the first, second and third sub-frequency bands 301, 303 and 305 and allows signal transmission/reception between the BS and an MS within the inner areas 311, 321 or 331 of each of Cell 1, Cell 2 and Cell 3 in the other sub-frequency bands except the sub-frequency band allocated to the outer area.

Figure 4:
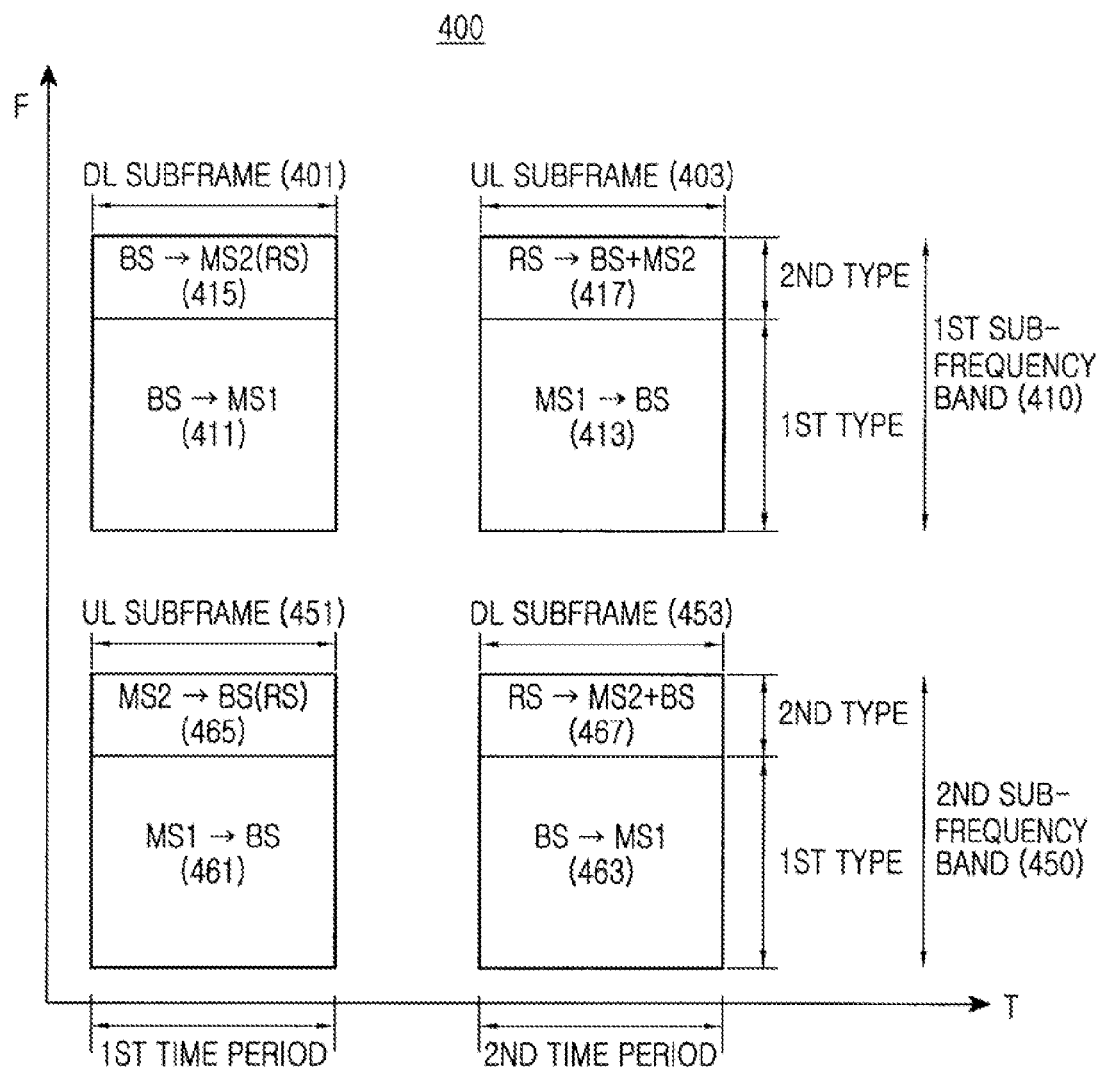
FIG. 4 illustrates a PFR-based frame structure in a communication system according to an exemplary embodiment of the present invention.

With reference to FIG. 4, a PFR-based frame structure in a communication system according to an exemplary embodiment of the present invention will be described below.

FIG. 4 illustrates a PFR-based frame structure in a communication system according to an exemplary embodiment of the present invention.

Referring to FIG. 4, the total frequency band of a frame 400 is divided into two sub-frequency bands, i.e. a first sub-frequency band 410 and a second sub-frequency band 450. An operation of the communication system using the first, second and third duplexing schemes and the PFR scheme will be described below.

1. First Duplexing Scheme

A BS transmits a signal to MS 1 within the inner area of a cell on a subchannel 411 of a first type in a DL subframe 401 of the first sub-frequency band 410. MS 1 transmits a signal to the BS on a subchannel 413 of the first type in a UL subframe 403 of the first sub-frequency band 410.

While it has been described above that the BS and MS 1 exchange signals on the subchannel 411 of the first type in the DL subframe 401 and on the subchannel 413 of the first type in the UL subframe 403 in the first sub-frequency band 410, the signal transmission/reception may instead occur using a subchannel 463 of the first type in a DL subframe 453 of the second sub-frequency band 450 and a subchannel 461 of the first type in a UL subframe 451 in the second sub-frequency band 450.

That is, the BS communicates with MS 1 in TDD in one of the first and second sub-frequency bands.

2. Second Duplexing Scheme

The BS transmits a signal to MS 2 within the outer area of the cell on a subchannel 415 of a second type in the DL subframe 401 of the first sub-frequency band 410 during a first time period. At the same time, MS 2 transmits a signal to the BS on a subchannel 465 of the second type in a UL subframe 451 of the second sub-frequency band 450.

While it has been described above that the BS and MS 1 exchange signals on the subchannel 415 of the second type in the DL subframe 401 of the first sub-frequency band 410 and on the subchannel 465 of the second type in the UL subframe 451 of the second sub-frequency band 450, it can be further contemplated that the BS transmits a signal to MS 2 on a subchannel 467 of the second type in the DL subframe 453 of the second sub-frequency band 450 and MS 2 transmits a signal to the BS on a subchannel 417 of the second type in the UL subframe 403 of the first sub-frequency band 410.

The first-type subchannels and the second-type subchannels will be described later.

3. Third Duplexing Scheme

When signal transmission/reception is carried out between the BS and MS 2 during the first time period, an RS detects the signals transmitted between the BS and MS 2 according to the third duplexing scheme and simultaneously transmits the detected signals to the BS and MS 2 during a second time period. To be more specific, when the BS transmits a DL signal to MS 2 on the second-type subchannel 415 in the DL subframe 401 of the first sub-frequency band 410 and MS 2 transmits a UL signal to the BS on the second-type subchannel 465 in the UL subframe 451 of the second sub-frequency band 450 during the first time period, the RS detects the DL and UL signals and combines them. During the second time period, the RS transmits the combined signal simultaneously to the BS and MS 2 on a second-type subchannel 417 in the UL subframe 403 of the first sub-frequency band 410 or on a second-type subchannel 467 in the DL subframe 453 of the second subframe band 450.

If the RS transmits the combined signal to the BS and MS 2 on the second-type subchannel 417 in the UL subframe 403 of the first sub-frequency band 410, the second-type subchannel 467 is not used in the DL subframe 453 of the second sub-frequency band 450. In this case, the BS can communicate with an extra MS in TDD on the second-type subchannel 465 in the UL subframe 451 of the second sub-frequency band 450 and the unused second-type subchannel 467 in the DL subframe 453 of the second sub-frequency band.

Figure 5:
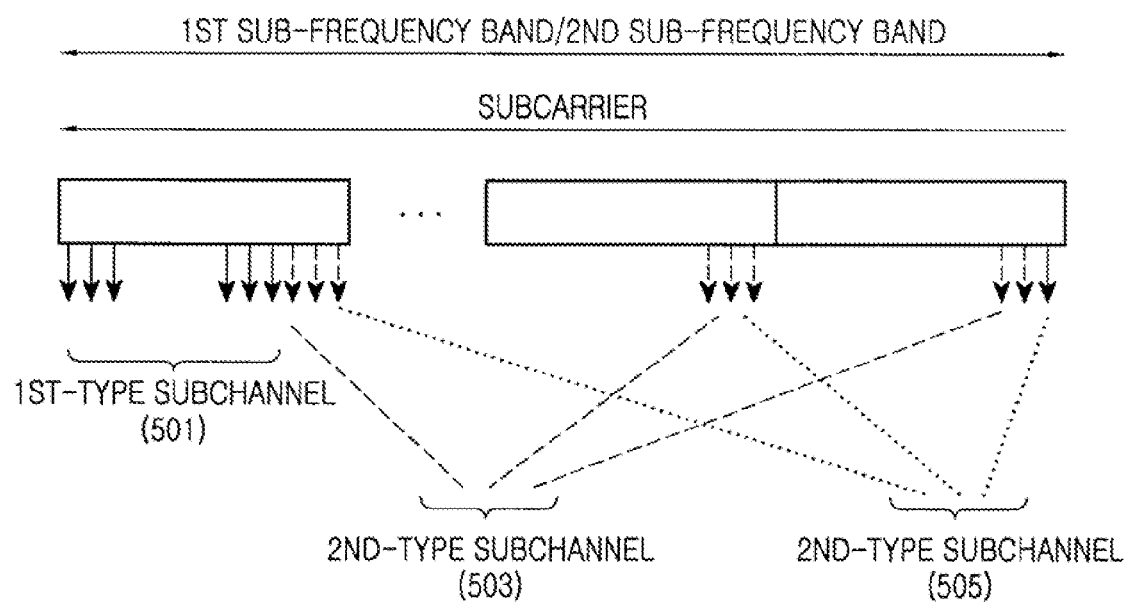
FIG. 5 illustrates PFR-based frequency band use in a communication system according to an exemplary embodiment of the present invention.

With reference to FIG. 5, the first-type subchannels and the second-type subchannels will be described below.

FIG. 5 illustrates PFR-based frequency band use in a communication system according to an exemplary embodiment of the present invention.

Referring to FIG. 5, each of the first and second sub-frequency bands includes a plurality of subcarriers.

A first-type subchannel 501 has successive subcarriers selected from among the subcarriers of the first or second sub-frequency band. Second-type subchannels 503 and 505 each include scattered (i.e. non-successive) subcarriers selected from among the subcarriers of the first or the second sub-frequency band. The second-type subchannels 503 and 505 have different subcarriers in each sub-frequency band.

The reason that a BS communicates with an MS within the inner area of its cell on the first-type subchannel is to improve the performance of the communication system. Also, the use of the second-type subchannels 503 and 505 for communications between a BS and an MS within the outer area of its cell serves the purpose of reducing neighbor cell interference and standardizing channels.

When the BS transmits and receives signals to and from the MS within the inner area of the cell on the first-type subchannel 501, a BS of a neighbor cell can communicate with an MS within the outer area of the neighbor cell in some subcarriers of the first-type subchannel 501.

Figure 6:
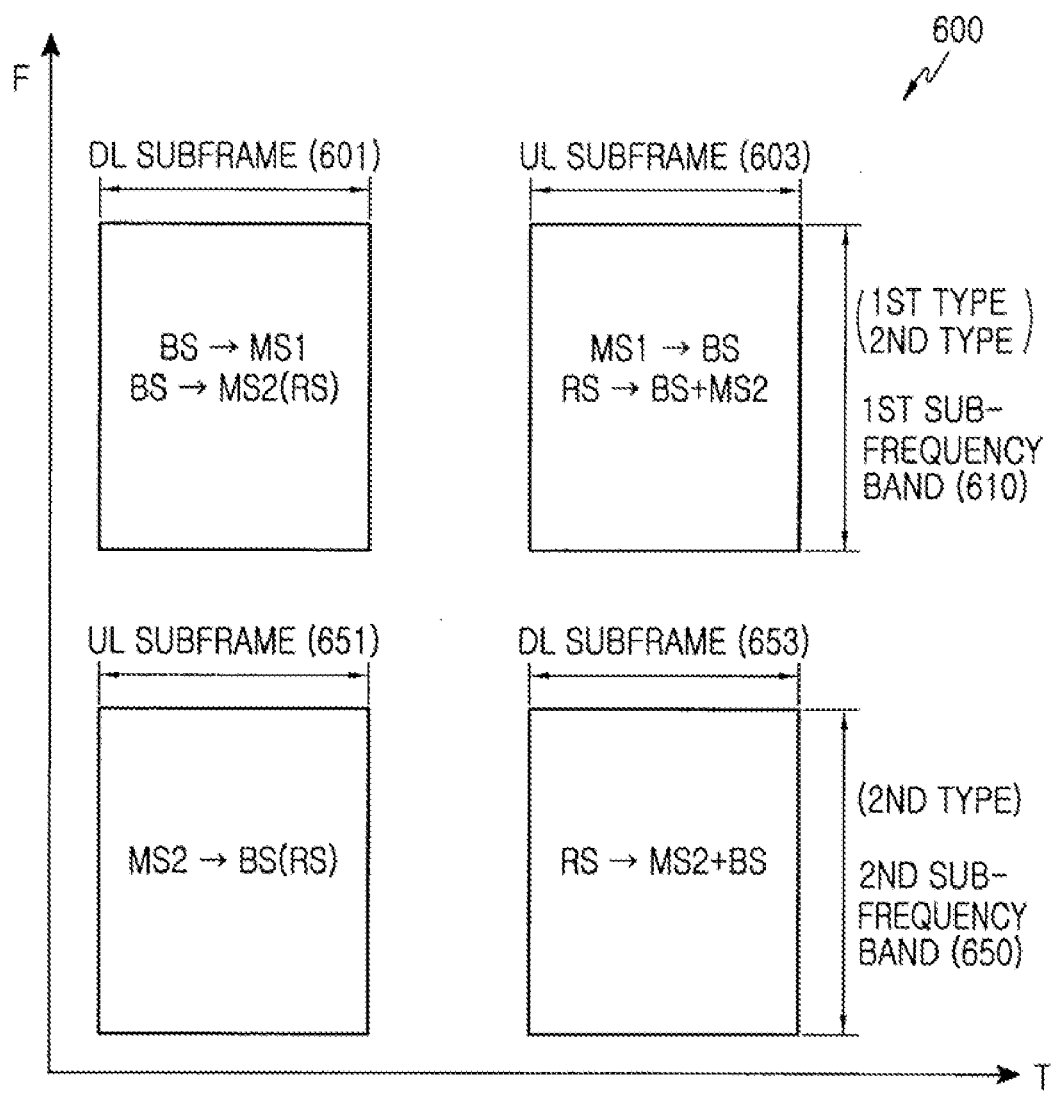
FIG. 6 illustrates an RP-based frame structure in a communication system according to an exemplary embodiment of the present invention.

With reference to FIG. 6, an RP-based frame structure in a communication system according to an exemplary embodiment of the present invention will be described below.

FIG. 6 illustrates an RP-based frame structure in a communication system according to an exemplary embodiment of the present invention.

Referring to FIG. 6, the total frequency band of a frame 600 is divided into two sub-frequency bands, i.e. a first sub-frequency band 610 and a second sub-frequency band 650. An operation of the communication system using the first, second and third duplexing schemes and the RP scheme will be described below.

1. First Duplexing Scheme

A BS transmits a signal to MS 1 within the inner area of a cell on a first-type subchannel in a DL subframe 601 of the first sub-frequency band 610 during a first time period. During a second time period, MS 1 transmits a signal to the BS on a first-type subchannel in a UL subframe 603 of the first sub-frequency band 610.

2. Second Duplexing Scheme

During the first time period, the BS transmits a signal to MS 2 within the outer area of the cell on a second-type subchannel in the DL subframe 601 of the first sub-frequency band 610. At the same time, MS 2 transmits a signal to the BS on a second-type subchannel in a UL subframe 651 of the second sub-frequency band 650.

3. Third Duplexing Scheme

When signal transmission/reception is carried out between the BS and MS 2 during the first time period, an RS detects the signals transmitted between the BS and MS 2 according to the third duplexing scheme and simultaneously transmits the detected signals to the BS and MS 2 during the second time period. More specifically, when the BS transmits a DL signal to MS 2 on the second-type subchannel in the DL subframe 601 of the first sub-frequency band 610 and MS 2 transmits a UL signal to the BS on the second-type subchannel in the UL subframe 651 of the second sub-frequency band 650 during the first time period, the RS detects the DL and UL signals and combines them. During the second time period, the RS transmits the combined signal simultaneously to the BS and MS 2 on a second-type subchannel in the UL subframe 603 of the first sub-frequency band 610 or on a second-type subchannel in the DL subframe 653 of the second subframe band 650.

Figure 7:
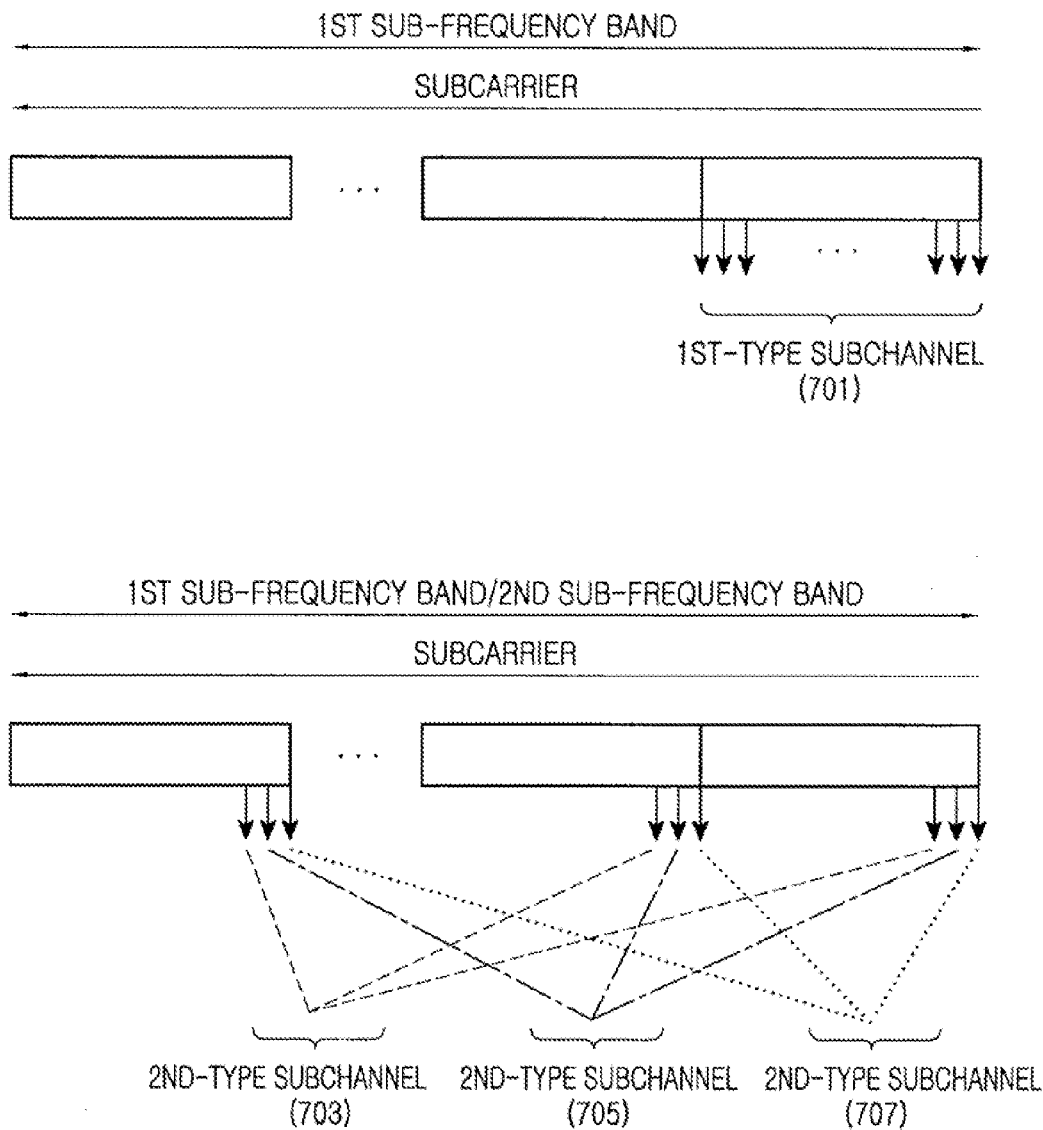
FIG. 7 illustrates RP-based frequency band use in a communication system according to an exemplary embodiment of the present invention.

With reference to FIG. 7, the first-type subchannels and the second-type subchannels will be described below.

FIG. 7 illustrates RP-based frequency band use in a communication system according to an exemplary embodiment of the present invention.

Referring to FIG. 7, each of the first and second sub-frequency bands includes a plurality of subcarriers.

A first-type subchannel 701 has successive subcarriers selected from among the subcarriers of the first sub-frequency band. Second-type subchannels 703, 705 and 707 each include scattered (i.e. non-successive) subcarriers selected from among the subcarriers of the first or the second sub-frequency bands.

A description will be made below of a frame structure based on the first duplexing scheme in a communication system according to an exemplary embodiment of the present invention with reference to FIGS. 8A and 8B.

Figure 8A:
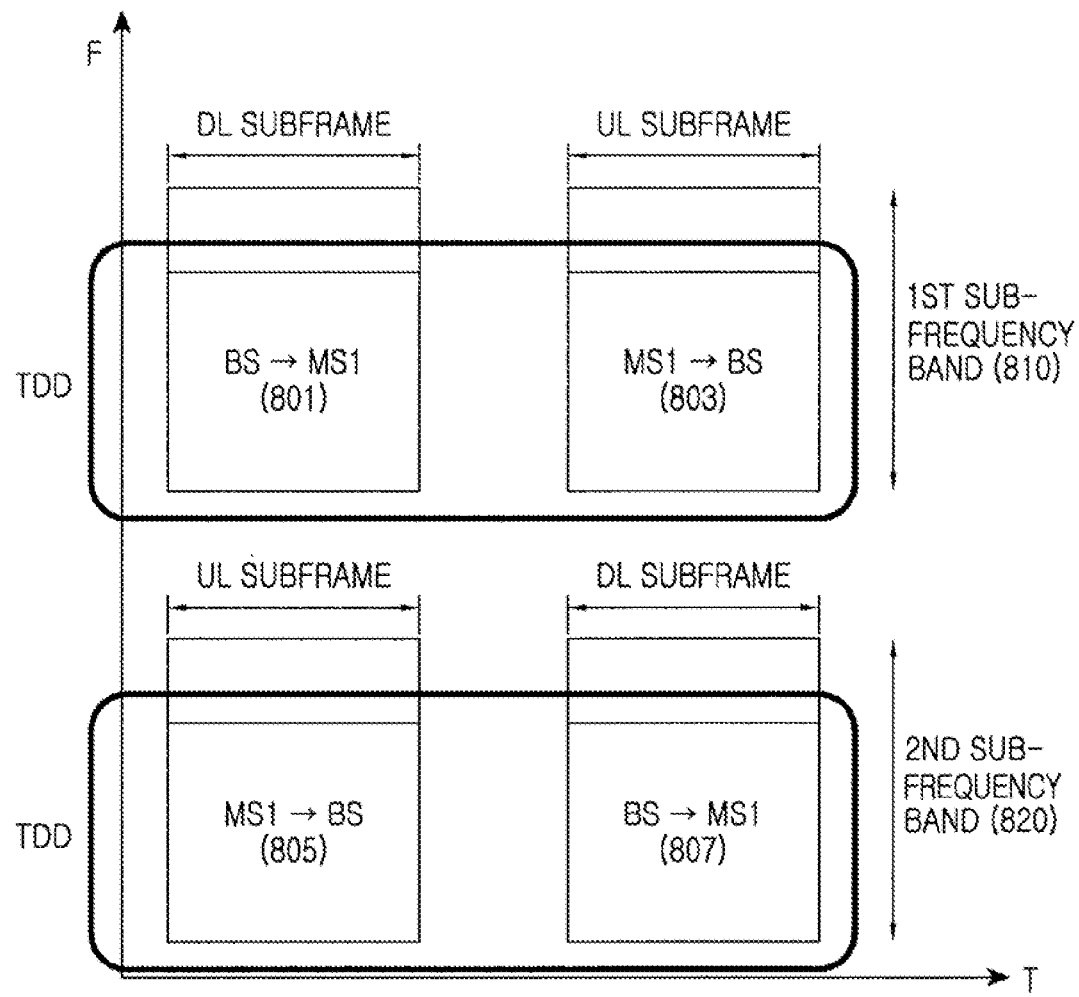
FIG. 8A illustrates a structure of a PFR-based first duplexing frame in a communication system according to an exemplary embodiment of the present invention.

FIG. 8A illustrates the structure of a PFR-based first duplexing frame in a communication system according to an exemplary embodiment of the present invention.

The first duplexing scheme refers to a transmission method in which a BS transmits a signal to an MS within an inner cell area in TDD.

Referring to FIG. 8A, the total frequency band of the frame is divided into two sub-frequency bands, i.e. first and second sub-frequency bands 810 and 820.

In the PFR-based communication system, a BS can transmit/receive a signal to/from MS 1 within the inner area of its cell in one of the first and second sub-frequency bands 810 and 820. For example, the BS transmits a signal to MS 1 within the inner area on a first-type subchannel 801 in a DL subframe of the first sub-frequency band 810, and MS 1 transmits a signal to the BS on a first-type subchannel 803 in a UL subframe of the first sub-frequency band 810.

In another example, the BS transmits a signal to MS 1 within the inner area on a first-type subchannel 805 in a DL subframe of the second sub-frequency band 820, and MS 1 transmits a signal to the BS on a first-type subchannel 807 in a UL subframe of the second sub-frequency band 820.

Figure 8B:
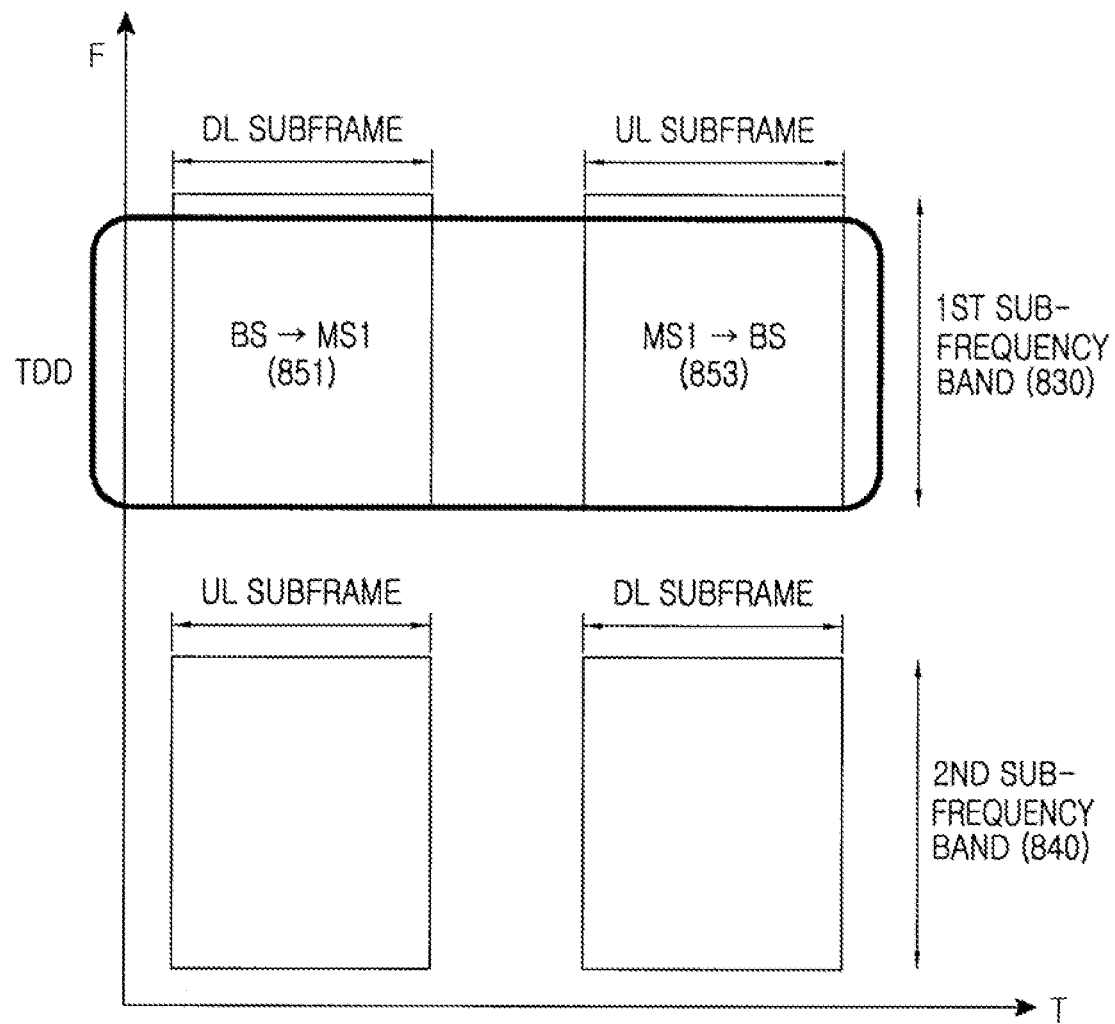
FIG. 8B illustrates a structure of an RP-based first duplexing frame in a communication system according to an exemplary embodiment of the present invention.

FIG. 8B illustrates the structure of an RP-based first duplexing frame in a communication system according to an exemplary embodiment of the present invention.

Referring to FIG. 8B, the total frequency band of the frame is divided into two sub-frequency bands, i.e. first and second sub-frequency bands 830 and 840.

According to the first duplexing scheme, a BS transmits a signal to MS 1 within the inner area of its cell on a first-type subchannel 851 in a DL subframe of the first sub-frequency band 830, and MS 1 transmits a signal to the BS on a first-type subchannel 853 in a UL subframe of the first sub-frequency band 830.

Now a description will be made of a frame structure based on the second duplexing scheme in a communication system according to an exemplary embodiment of the present invention with reference to FIGS. 9A and 9B.

Figure 9A:
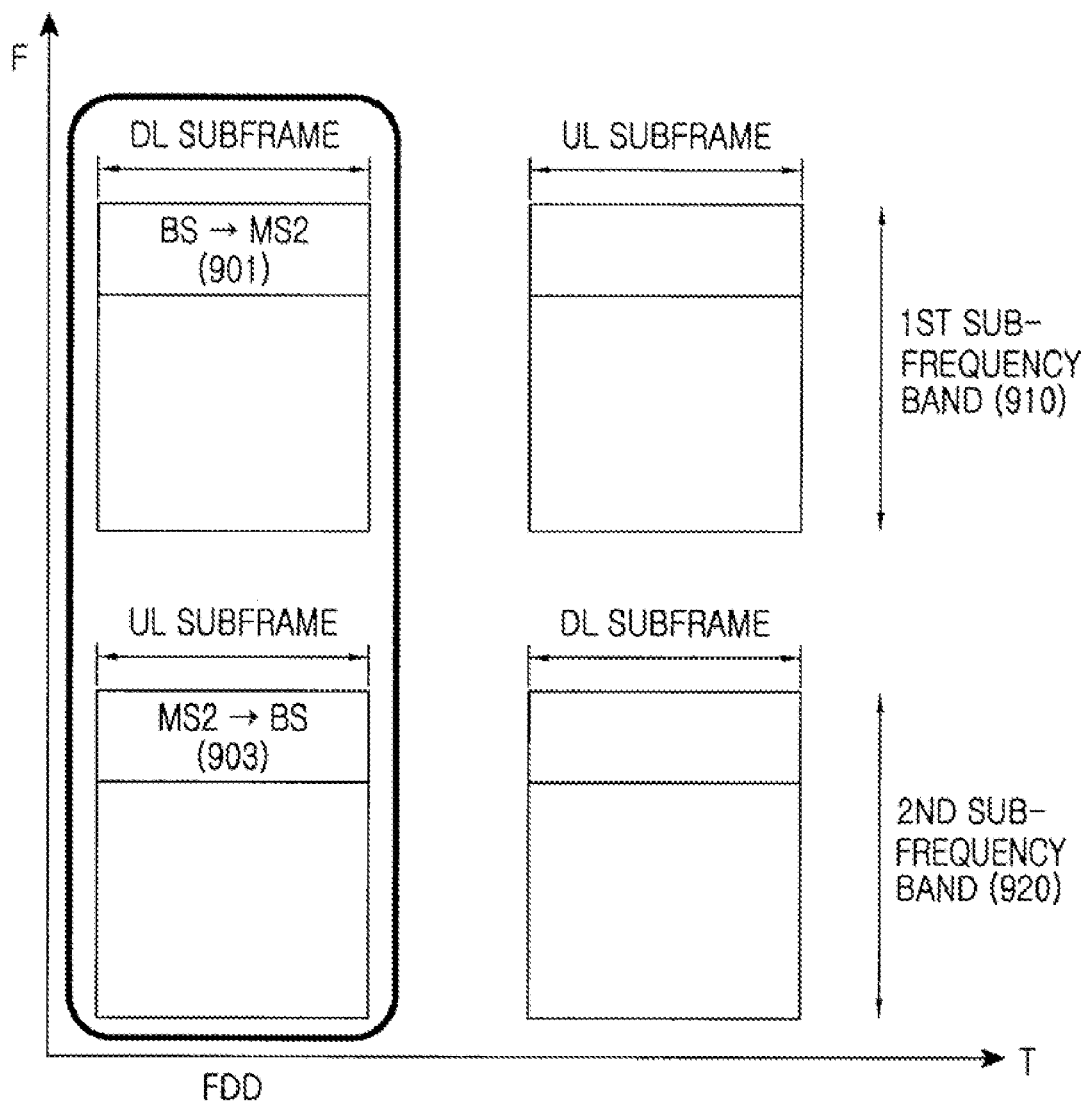
FIG. 9A illustrates a structure of a PFR-based second duplexing frame in a communication system according to an exemplary embodiment of the present invention.

FIG. 9A illustrates the structure of a PFR-based second duplexing frame in a communication system according to an exemplary embodiment of the present invention.

The second duplexing scheme refers to a transmission method in which a BS transmits a signal to an MS within an outer cell area in FDD.

Referring to FIG. 9A, the total frequency band of the frame is divided into two sub-frequency bands, i.e. first and second sub-frequency bands 910 and 920.

In the PFR-based second duplexing scheme, during a first time period, a BS can transmit and receive signals to and from MS 2 within the outer area of its cell on a second-type subchannel 901 in a DL subframe of the first sub-frequency band 910 and a second-type subchannel 903 in a UL subframe of the second sub-frequency band 920, or on a second-type subchannel in a DL subframe of the second sub-frequency band 920 and a second-type subchannel in a UL subframe of the first sub-frequency band 910. For example, during the first time period, the BS transmits a signal to MS 2 on the second-type subchannel 901 in the DL subframe of the first sub-frequency band 910 and MS 2 transmits a signal to the BS on the second-type subchannel 903 in the UL subframe of the second sub-frequency band 920.

In another example, during the first time period, the BS transmits a signal to MS 2 on the second-type subchannel in the DL subframe of the second sub-frequency band 920 and MS 2 transmits a signal to the BS on the second-type subchannel in the UL subframe of the first sub-frequency band 910.

Figure 9B:
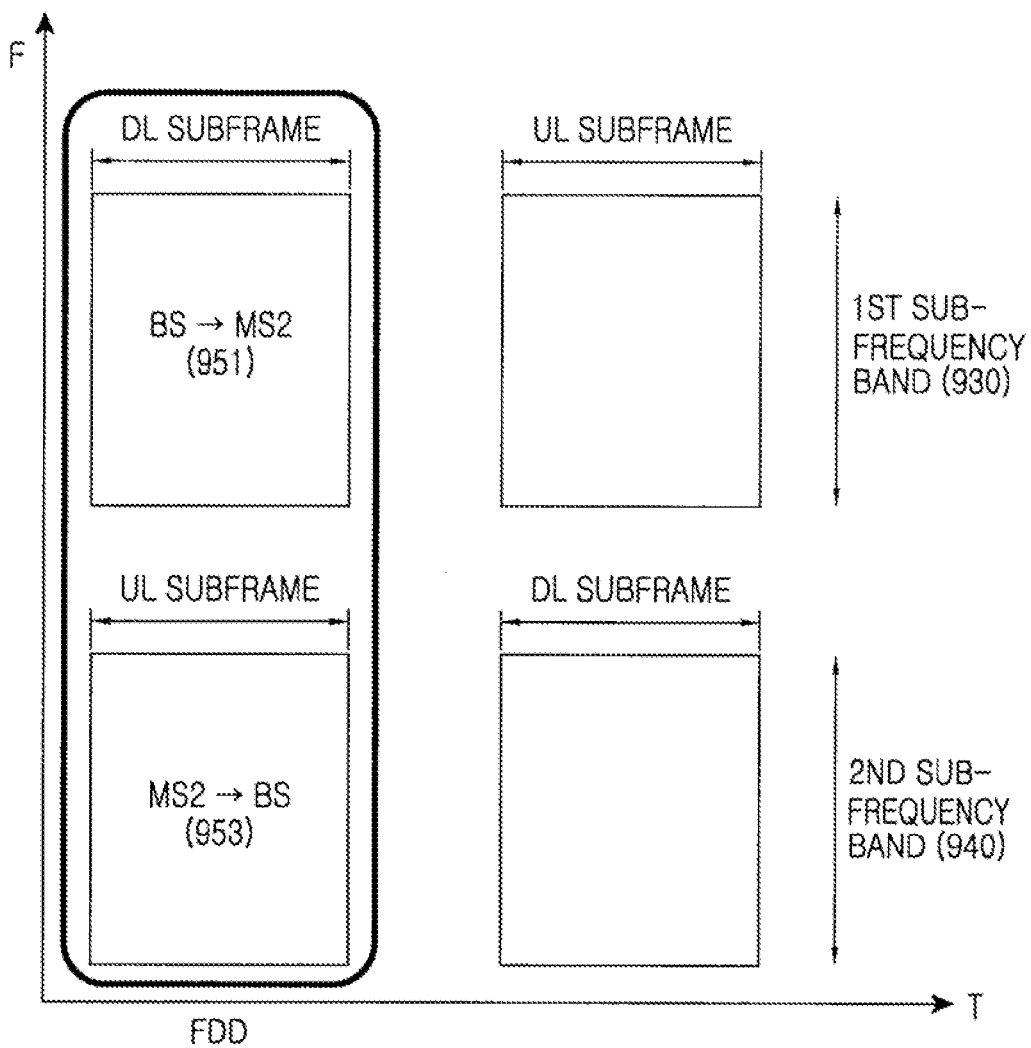
FIG. 9B illustrates a structure of an RP-based second duplexing frame in a communication system according to an exemplary embodiment of the present invention.

FIG. 9B illustrates the structure of an RP-based second duplexing frame in a communication system according to an exemplary embodiment of the present invention.

Referring to FIG. 9B, the total frequency band of the frame is divided into two sub-frequency bands, i.e. first and second sub-frequency bands 930 and 940.

According to the RS-based second duplexing scheme, during a first time period, MS 2 within an outer area of a cell transmits a signal to a BS on a second-type subchannel 953 in a UL subframe of the second sub-frequency band 940, and the BS transmits a signal to MS 2 on a second-type subchannel 951 in a DL subframe of the first sub-frequency band 930.

As described above, when MS 2 within the outer area of the cell transmits a signal to the BS in the UL subframe of the second sub-frequency band 940 according to the RP-based second duplexing scheme, the communication system can change a frequency reuse factor. The cell having the BS and MS 2 determines neighbor cell interference by measuring the signal strength of an unused sub-frequency band and changes the frequency reuse factor accordingly. If the neighbor cell interference is weak, the frequency reuse factor is set to be close to 1 and if the neighbor cell interference is strong, the frequency reuse factor is set to be larger than 1.

When the BS transmits a signal to MS 2 within the outer area according to the RP-based second duplexing scheme, the transmission could be performed in the DL subframe of the first sub-frequency band. Herein, the frequency reuse factor for the DL subframe depends on the first duplexing scheme. That is, if the BS transmits a signal to MS 2 within the outer area, the signal interferes with an MS in a neighbor cell. Therefore, a frequency reuse factor of 1 cannot be used. Hence, a frequency reuse factor for communications with MS 2 in the outer area is different from that for communications with MS 1 in the inner area.

Figure 10A:
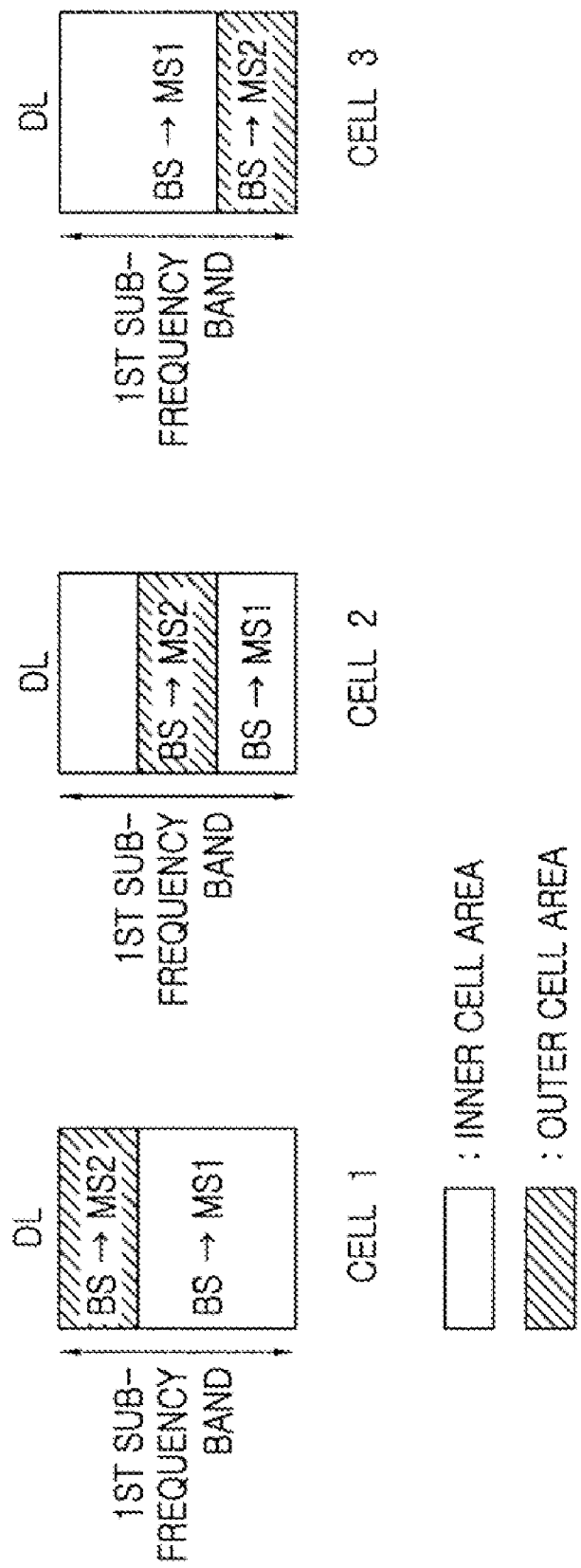
FIGS. 10A and 10B illustrate structures of cell planning frames in an RP-based second duplexing scheme in a communication system according to an exemplary embodiment of the present invention.
Figure 10B:
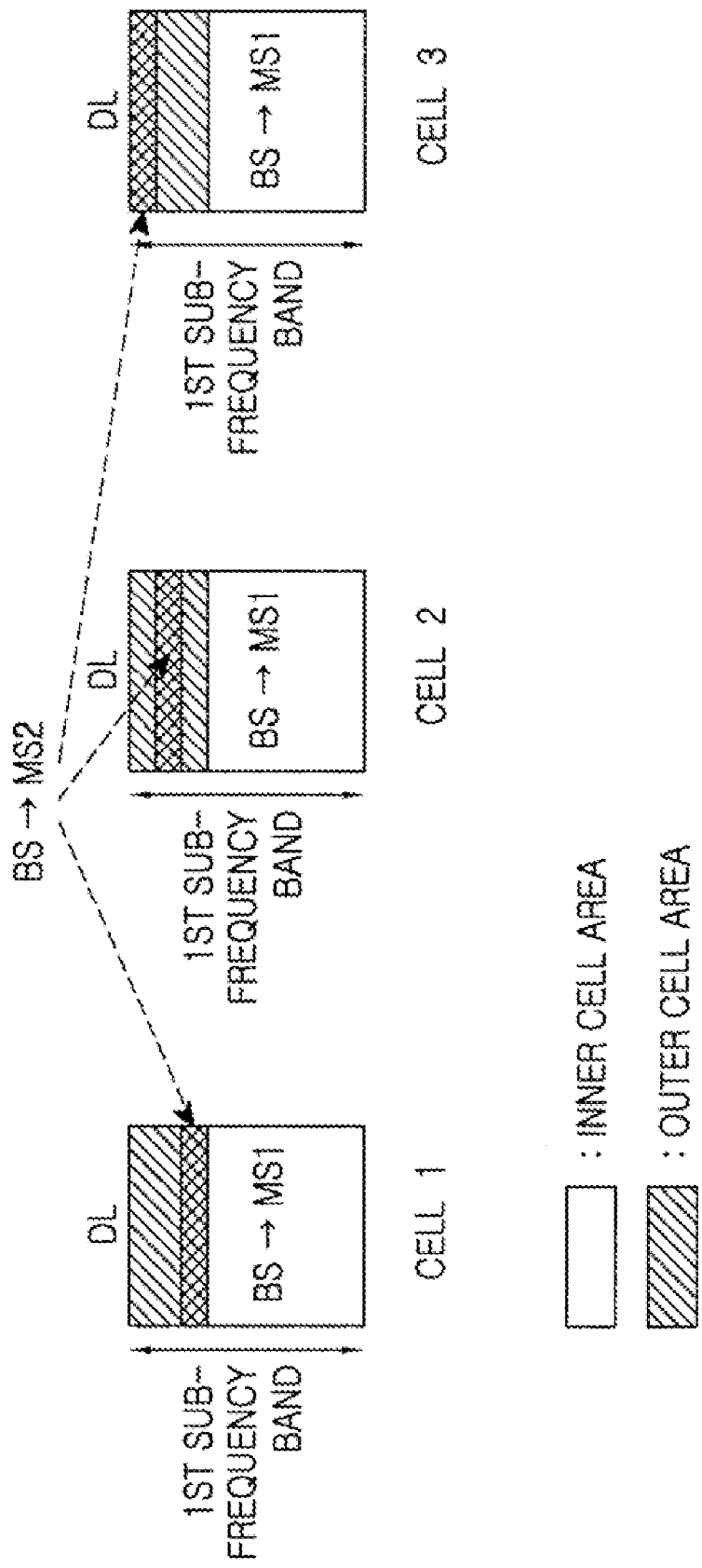

With reference to FIGS. 10A and 10B, a method for cell planning for an MS within an outer area in the RP-based second duplexing scheme in the communication system according to an exemplary embodiment of the present invention will be described below.

FIGS. 10A and 10B illustrate structures of cell planning frames in an RP-based second duplexing scheme in a communication system according to an exemplary embodiment of the present invention.

Referring to FIGS. 10A and 10B, each cell is divided into an inner area and an outer area in the communication system. It is assumed herein that a frequency reuse factor is 1 for the inner area and 3 for the outer area.

FIG. 10A illustrates a frame that is planned by taking into account the frequency reuse factors of both the inner and outer areas. When a BS transmits a signal to MS 1 within an outer area of a cell, the transmission is carried out in a frequency band allocated to a DL frame, taking into account the frequency reuse factors of 1 and 3 for the inner area and the outer area.

FIG. 10B illustrates a frame that is planned by taking into account only the frequency reuse factor of the outer area.

When the BS transmits a signal to MS 1 within the inner area, it carries out the transmission by allocating a fixed part of the DL frame, taking into account the frequency reuse factor of 1 for the inner area. When the BS transmits a signal to MS 2 within the outer area of the cell, it divides the remaining band of the DL subframe into three parts according to the frequency reuse factor of 3 for the outer area and allocates a preset one of the three parts to the outer area, for the signal transmission.

A description will be made of a frame structure based on the PFR-based third duplexing scheme in the communication system according to an exemplary embodiment of the present invention with reference to FIGS. 11A and 11B.

Figure 11A:
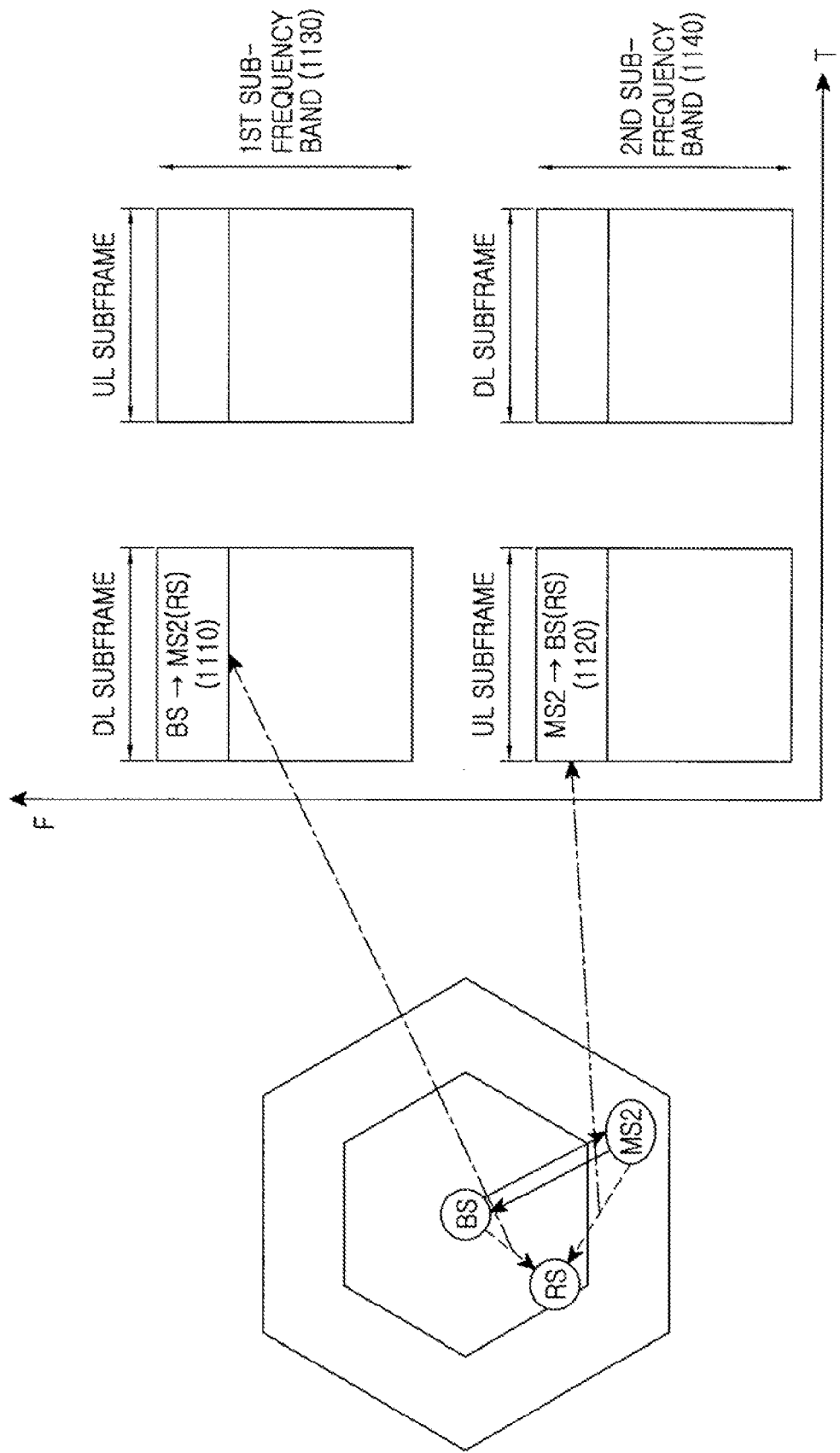
FIGS. 11A and 11B illustrate a structure of a PFR-based third duplexing frame in a communication system according to an exemplary embodiment of the present invention.

FIG. 11A illustrates a structure of a PFR-based third duplexing frame in a communication system according to an exemplary embodiment of the present invention.

Referring to FIG. 11A, when, during a first time period, a BS transmits a signal to MS 2 within the outer area of its cell on a second-type subchannel 1110 in a DL subframe of a first sub-frequency band 1130 according to the second duplexing scheme, and MS 2 transmits a signal to the BS on a second-type subchannel 1120 in a UL subframe of a second sub-frequency band 1140 according to the second duplexing scheme, an RS detects the DL signal transmitted from the BS to MS 2 on the second-type subchannel 1110 in the DL subframe of the first sub-frequency band 1130 and the UL signal transmitted from MS 2 to the BS on the second-type subchannel 1120 in the UL subframe of the second sub-frequency band 1140.

As described above, the RS detects the UL signal and the DL signal in different sub-frequency bands during the first time period.

Figure 11B:
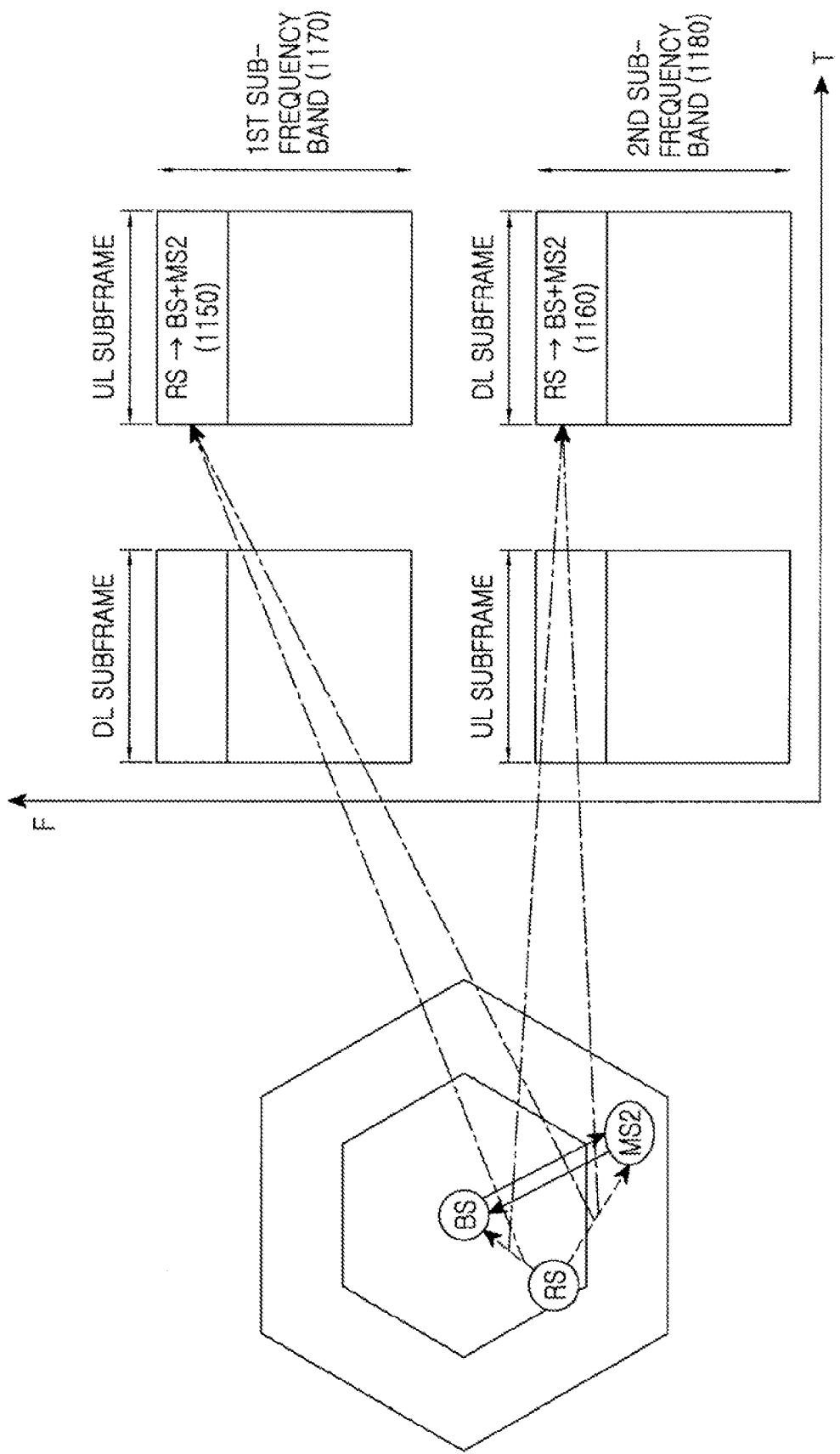

FIG. 11B illustrates a structure of a PFR-based third duplexing frame in a communication system according to an exemplary embodiment of the present invention.

Referring to FIG. 11B, the RS combines the detected signals in FIG. 11A, i.e. the DL and UL signals.

Then the RS transmits the combined signal simultaneously to the BS and MS 2 on a second-type subchannel 1150 of a UL subframe of a first sub-frequency band 1170 or on a second-type subchannel 1160 of a DL subframe of a second sub-frequency band 1180 during a second time period.

Figure 12:
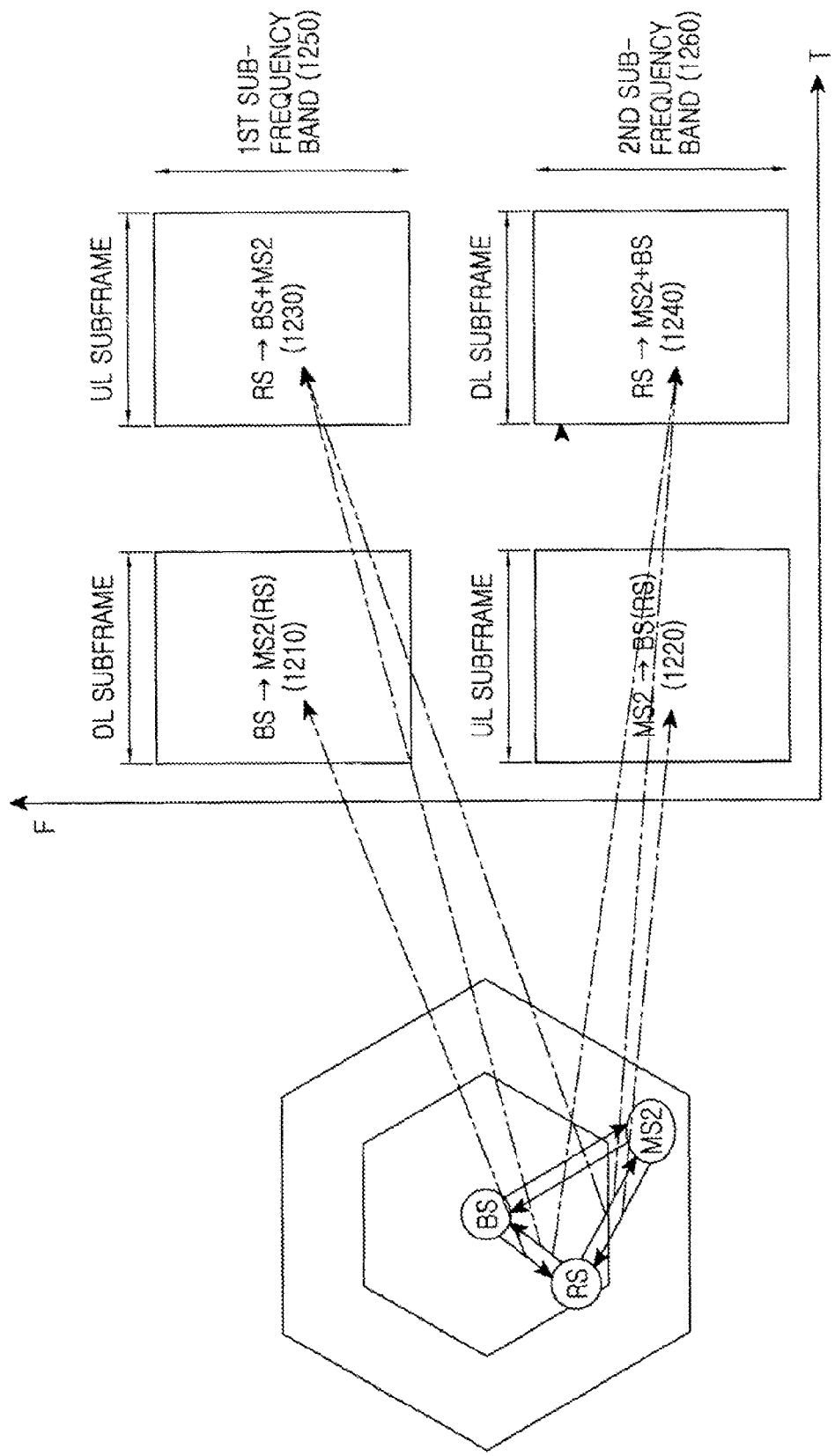
FIG. 12 illustrates a structure of an RP-based third duplexing frame in a communication system according to an exemplary embodiment of the present invention.

With reference to FIG. 12, a structure of an RP-based third duplexing frame in a communication system according to an exemplary embodiment of the present invention will be described below.

FIG. 12 illustrates a structure of an RP-based third duplexing frame in a communication system according to an exemplary embodiment of the present invention.

Referring to FIG. 12, when, during a first time period, a BS transmits a signal to MS 2 within the outer area of its cell on a second-type subchannel 1210 in a DL subframe of a first sub-frequency band 1250 according to the second duplexing scheme, and MS 2 transmits a signal to the BS on a second-type subchannel 1220 in a UL subframe of a second sub-frequency band 1260 according to the second duplexing scheme, an RS detects the DL signal transmitted from the BS to MS 2 on the second-type subchannel 1210 in the DL subframe of the first sub-frequency band 1250 and the UL signal transmitted from MS 2 to the BS on the second-type subchannel 1220 in the UL subframe of the second sub-frequency band 1260.

As described above, the RS detects the DL signal and the UL signal in different sub-frequency bands.

The RS combines the detected signals, i.e. the DL and UL signals. Then the RS transmits the combined signal simultaneously to the BS and MS 2 on a second-type subchannel 1230 of a UL subframe of the first sub-frequency band 1250 or on a second-type subchannel 1240 of a DL subframe of the second sub-frequency band 1260 during a second time period.

A method for controlling a size of an inner cell area and transmission power in a communication system according to an exemplary embodiment of the present invention will be described with reference to FIG. 13.

Figure 13:
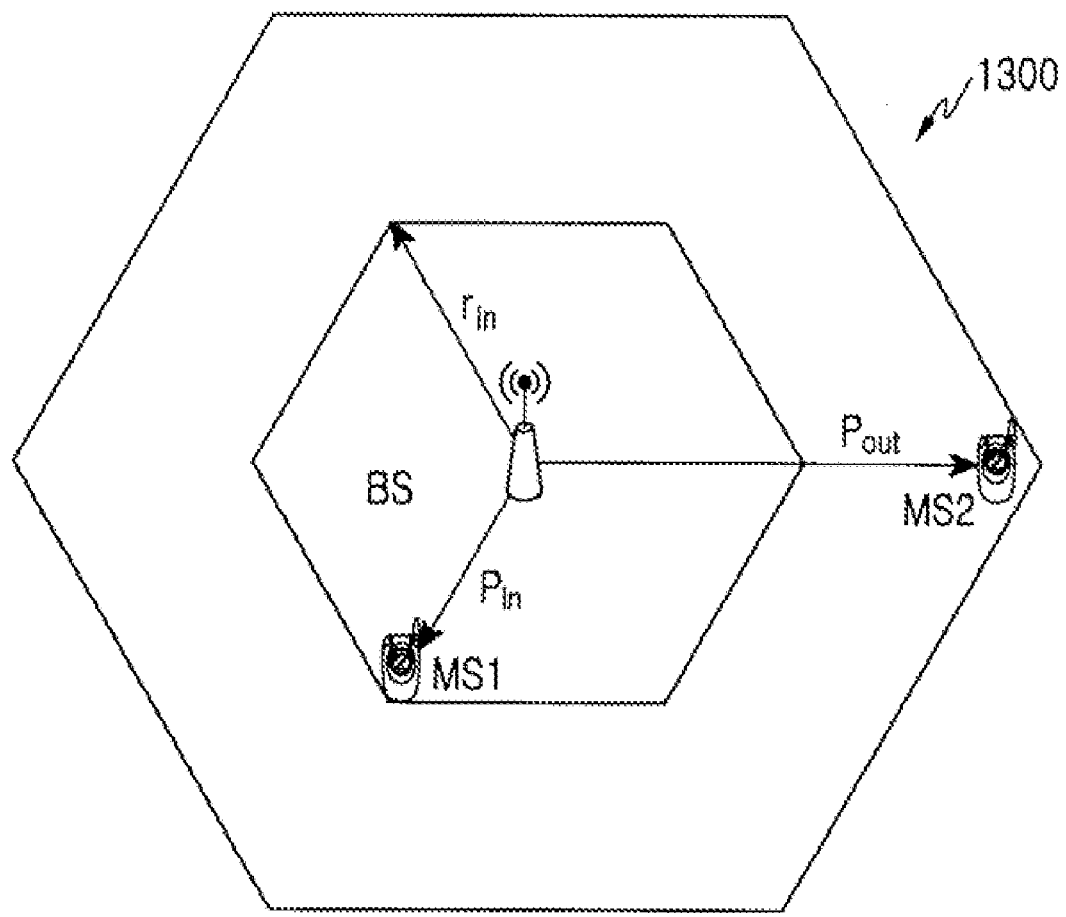
FIG. 13 illustrates a cell structure in a communication system according to an exemplary embodiment of the present invention.

FIG. 13 illustrates a cell structure in a communication system according to an exemplary embodiment of the present invention.

Referring to FIG. 13, the communication system adaptively controls the size ($r_{in}$) of the inner area of a cell 1300 and the transmission powers $P_{in}$ and $P_{out}$) of a BS for MSs in order to satisfy the Signal-to-Noise Ratio (SNR) requirements of the MSs within the inner and outer areas of the cell 1300.

More specifically, the BS satisfies a reception SNR requested by the MS within the outer area by adaptively adjusting the ratio between the transmission power to the MS within the inner area ($P_{in}$) and the transmission power to the MS within the outer area ($P_{out}$).

Neighbor cell interference and the ratio between $P_{in}$ and $P_{out}$ are adaptively controlled by adaptively determining the size ($r_{in}$) of the inner area.

For example, if $r_{in}$ is reduced, the interference between the MS within the inner area and the MS within the outer area drops. That is, a reception SNR requested by the MS within the inner area can be satisfied even though a signal is transmitted at a lower power level to the MS.

On the other hand, if $r_{in}$ is increased, the BS could use a higher transmission power to satisfy the reception SNR requested by the MS within the inner area.

Figure 14:
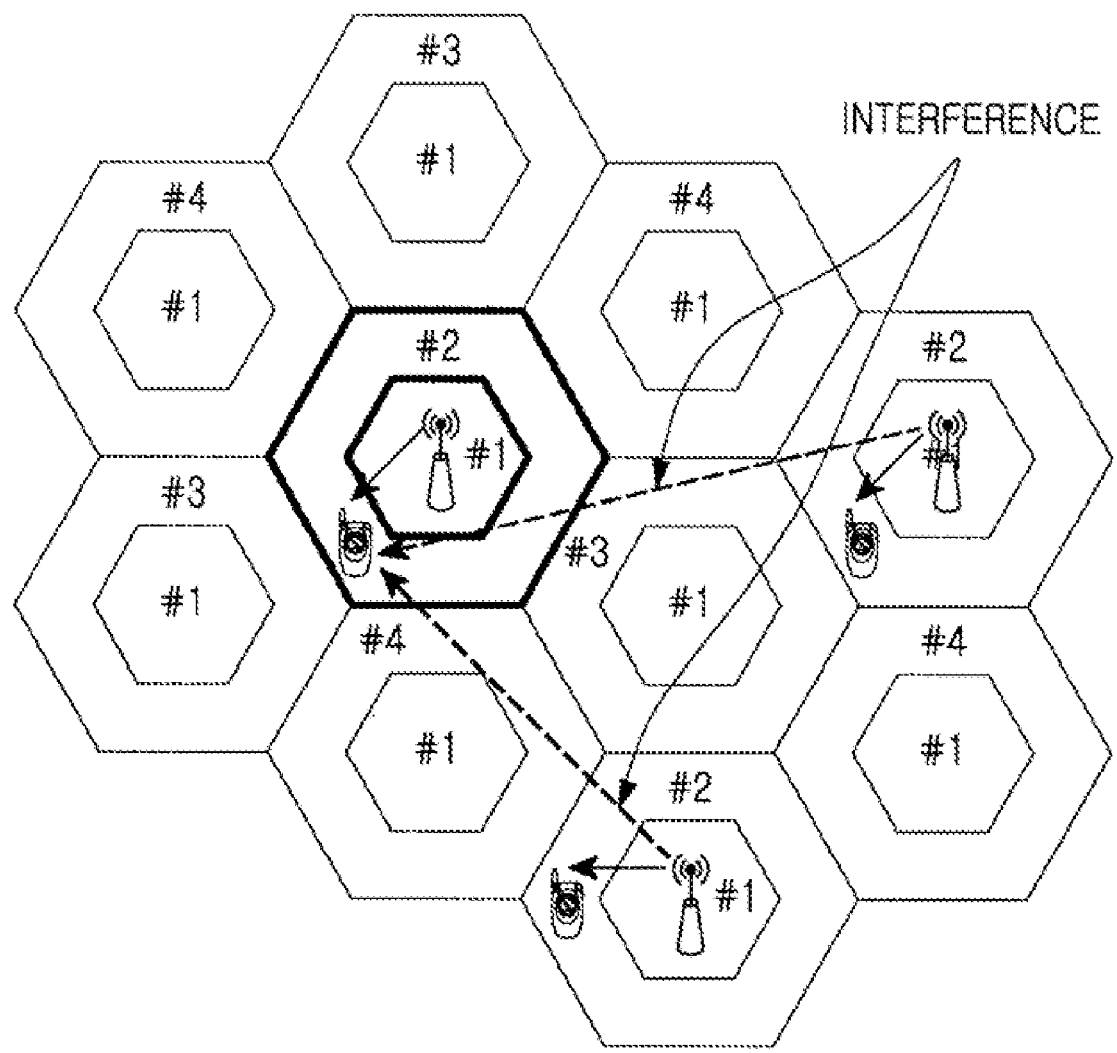
FIG. 14 illustrates inter-cell interference in the case of RP in a communication system according to an exemplary embodiment of the present invention.

With reference to FIG. 14, inter-cell interference in the case of RP in the communication system according to an exemplary embodiment of the present invention will be described below.

FIG. 14 illustrates inter-cell interference in a case of RP in a communication system according to an exemplary embodiment of the present invention.

Referring to FIG. 14, since different subchannels are allocated to the inner and outer areas of a cell in the RP scheme, there is substantially no interference between the inner area and the outer area.

An MS-requested reception SNR can be met by adaptively deciding the frequency reuse factor of the outer area and the size of the inner area ($r_{in}$) can be determined by adaptively deciding the frequency reuse factor of the inner area.

Interference illustrated in FIG. 14 is interference between the outer areas of cells using the same subchannel, when a frequency reuse factor of 3 applies to the outer areas.

More specifically, assuming that signal transmission takes place in a first sub-frequency band in the inner area and in a second sub-frequency band in the outer area, an MS within the outer area experiences interference from the outer areas of cells to which the same frequency band as that of the outer area is allocated.

Figure 15:
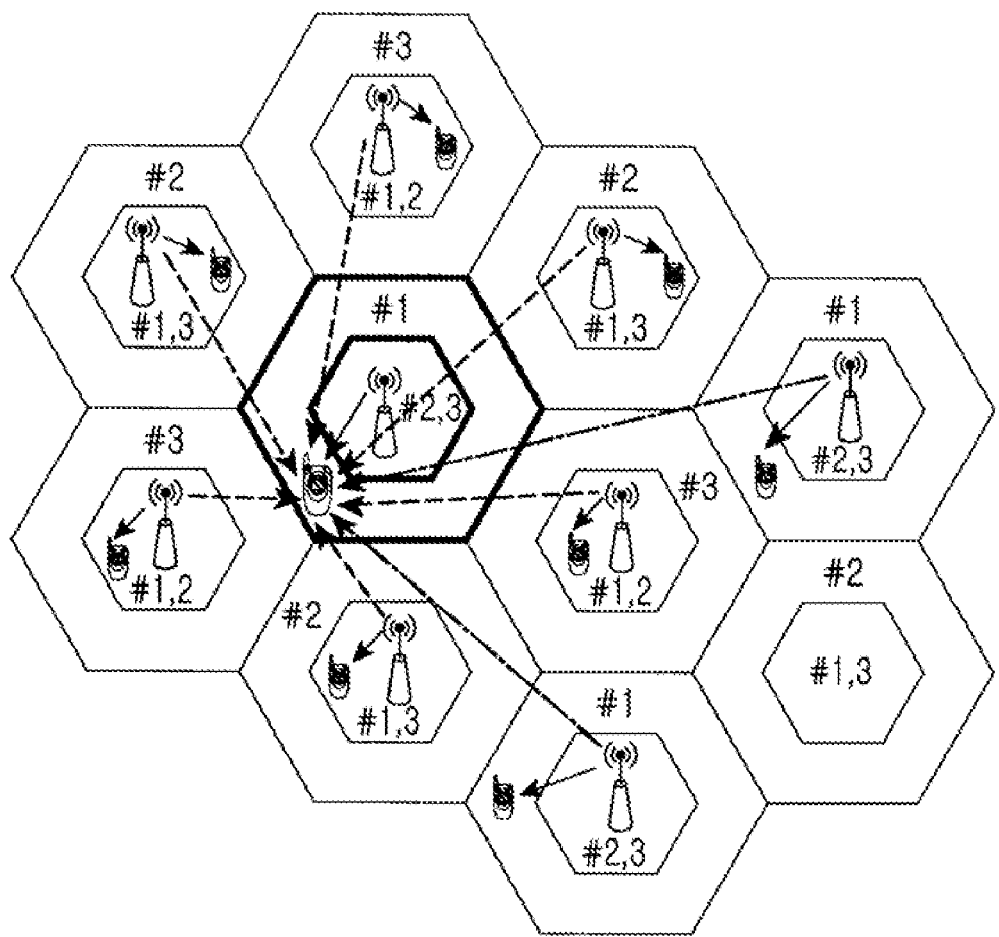
FIG. 15 illustrates inter-cell interference that a Mobile Station (MS) within an outer area of a cell experiences in a case of PFR in a communication system according to an exemplary embodiment of the present invention.

With reference to FIG. 15, inter-cell interference in the case of PFR in the communication system according to an exemplary embodiment of the present invention.

FIG. 15 illustrates inter-cell interference that an MS within an outer area of a cell experiences in a case of PFR in a communication system according to an exemplary embodiment of the present invention.

Referring to FIG. 15, when the frequency reuse factor of the outer area of a cell is 3, for example, the interference of the outer area includes interference from the inner area of a neighbor cell and frequency reuse factor-associated interference from the outer area of the neighbor cell.

Once the frequency reuse factors of the inner and outer areas of the cell are decided, the ratio between transmission power for an MS within the inner area and transmission power for an MS within the outer area can be adjusted in order to satisfy a reception SNR requested by the MS within the outer area.

Figure 16:
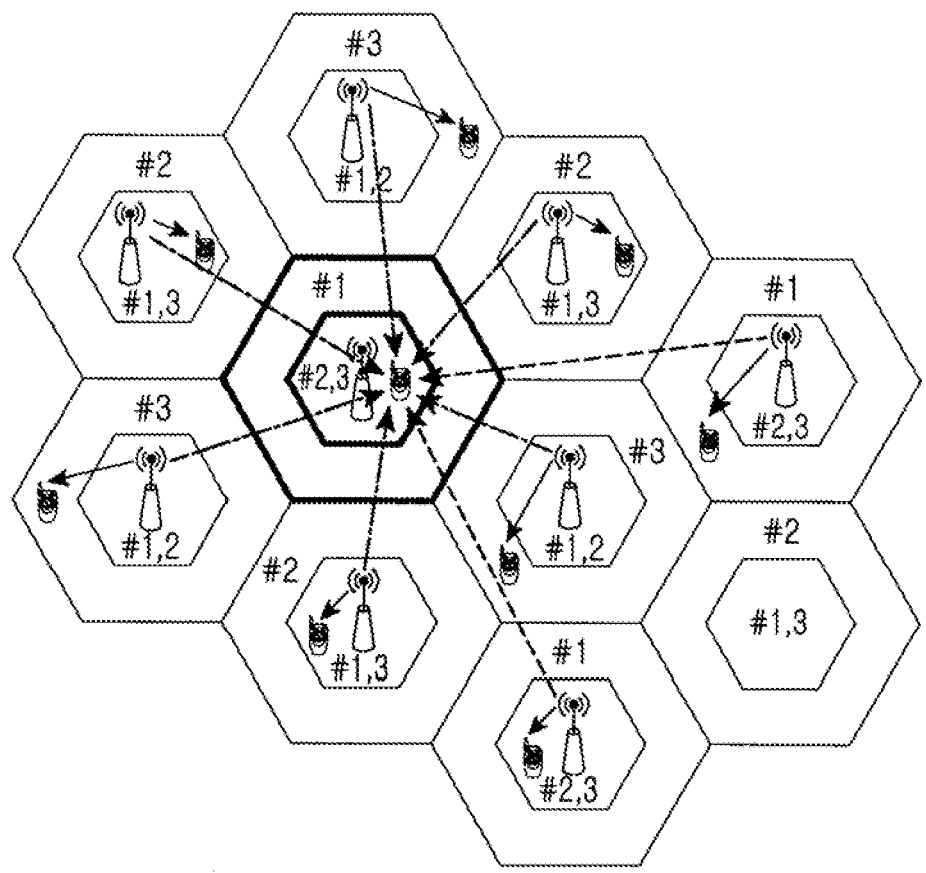
FIG. 16 illustrates interference that an MS within an inner area of a cell experiences in a case of PFR in a communication system according to an exemplary embodiment of the present invention.

With reference to FIG. 16, PFR-associated inter-cell interference in a communication system according to an exemplary embodiment of the present invention will be described below.

FIG. 16 illustrates interference that an MS within an inner area of a cell experiences in a case of PFR in a communication system according to an exemplary embodiment of the present invention.

In the PFR scheme, subchannels used in the inner area of a cell can also be used in the outer area of a neighbor cell. Therefore, an MS within the inner area of the cell is affected by interference caused by the frequency reuse factor of the inner area of the neighbor cell and interference from the outer area of the neighbor cell.

Referring to FIG. 16, if a frequency reuse factor of 3 applies to the outer area of a cell, for example, interference that affects the outer area includes interference from the inner and outer areas of a neighbor cell and frequency reuse factor-incurred interference from the inner area of the neighbor cell.

When the radio between transmission power ($P_{in}$) for an MS within the inner area of the cell and transmission power ($P_{out}$) for an MS within the outer area of the cell is determined, the communication system can change the size ($r_{in}$) of the inner area of the cell to satisfy a reception SNR requested by the MS within the inner area of the cell.

Figure 17:
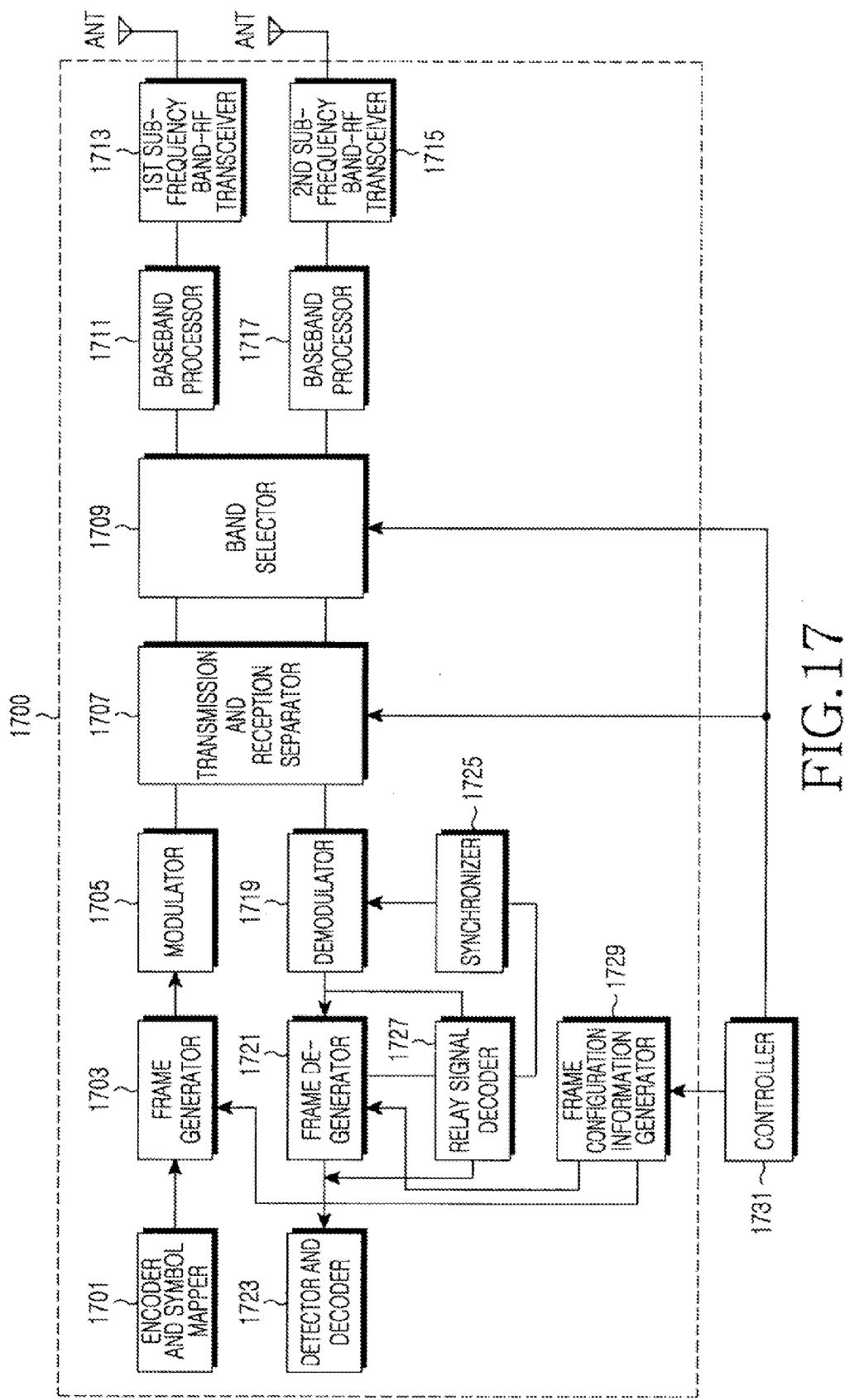
FIG. 17 is a block diagram of a BS in a communication system according to an exemplary embodiment of the present invention.

With reference to FIG. 17, a configuration of a BS in a communication system according to an exemplary embodiment of the present invention will be described.

FIG. 17 is a block diagram of a BS in a communication system according to an exemplary embodiment of the present invention.

Referring to FIG. 17, a BS 1700 includes an encoder and symbol mapper 1701, a frame generator 1703, a modulator 1705, a transmission and reception separator 1707, a band selector 1709, baseband processors 1711 and 1717, a first sub-frequency band-Radio Frequency (RF) transceiver 1713, a second sub-frequency band-RF transceiver 1715, a demodulator 1719, a frame de-generator 1721, a detector and decoder 1723, a synchronizer 1725, a relay signal decoder 1727, a frame configuration information generator 1729, and a controller 1731.

The encoder and symbol mapper 1701 encodes data, a control signal, and a pilot/preamble signal to be transmitted in a preset coding scheme and maps the coded data. The frame generator 1703 configures a frame with the data, the control signal, and the pilot/preamble signal based on frame configuration information received from the controller 1731 and the frame configuration information generator 1729. The modulator 1705 modulates the frame in a preset modulation scheme and configures transmission symbols through a pulse shaping filter.

The transmission and reception separator 1707 determines transmission slots and reception slots in each sub-frequency band for signal transmission/reception to/from an MS or an RS according to transmission and reception timing information received from the controller 1731 and outputs the transmission and reception slots to the band selector 1709. The transmission and reception separator 1707 also outputs transmission symbols received from the modulator 1705 to the band selector 1705 or a signal received from the band selector 1709 to the demodulator 1719 according to the transmission and reception timing information.

The band selector 1709 selects a sub-frequency band in which to transmit the transmission symbols according to path information received from the controller 1731 and the transmission and reception slots of each sub-frequency band received from the transmission and reception separator 1707 and outputs the transmission symbols received from the transmission and reception separator 1707 to one of the baseband processors 1711 and 1717 according to the selected sub-frequency band. The band selector 1709 also outputs signals received from the baseband processors 1711 and 1717 to the transmission and reception separator 1707. The afore-described first, second and third duplexing schemes are determined based on the sub-frequency band and the time slots decided by the band selector 1709 and the transmission and reception separator 1707.

A signal output from the band selector 1709 in the determined sub-frequency band is transmitted to the MS or the RS through the baseband processor 1711 and the first sub-frequency band-RF transceiver 1713 or through the baseband processor 1717 and the second sub-frequency band-RF transceiver 1715.

A signal received from the MS or the RS is provided to the demodulator 1719 after processing in the first or second sub-frequency band-RF transceiver 1713 or 1715, the baseband processor 1711 or 1717, the band selector 1709, and the transmission and reception separator 1707.

The demodulator 1719 demodulates the received signal in a demodulation scheme corresponding to a preset modulation scheme and the frame de-generator 1721 separates the demodulated signal into a control signal and data and provides a pilot and preamble signal of the received signal to the synchronizer 1725.

The synchronizer 1725 performs channel estimation with respect to the RS or the MS and acquires system synchronization using the pilot/preamble signal. The detector and decoder 1723 decodes the data and the control signal received from the frame de-generator 1721 in a decoding scheme corresponding to a preset coding scheme.

The relay signal decoder 1727 eliminates a signal transmitted by the BS from a signal received from the RS and decodes the resulting received signal. The relay signal decoder 1727 is related to a network coding technique, which will not be described in detail herein.

The controller 1731 controls the frame generator 1703 and the frame de-generator 1721 based on channel state information received from the RS or the MS, position information about the RS and the MS for communications, and position information of the BS and provides the transmission and reception timing information and the path information for deciding the first, second and third duplexing schemes to the transmission and reception separator 1707 and the band selector 1709.

Figure 18:
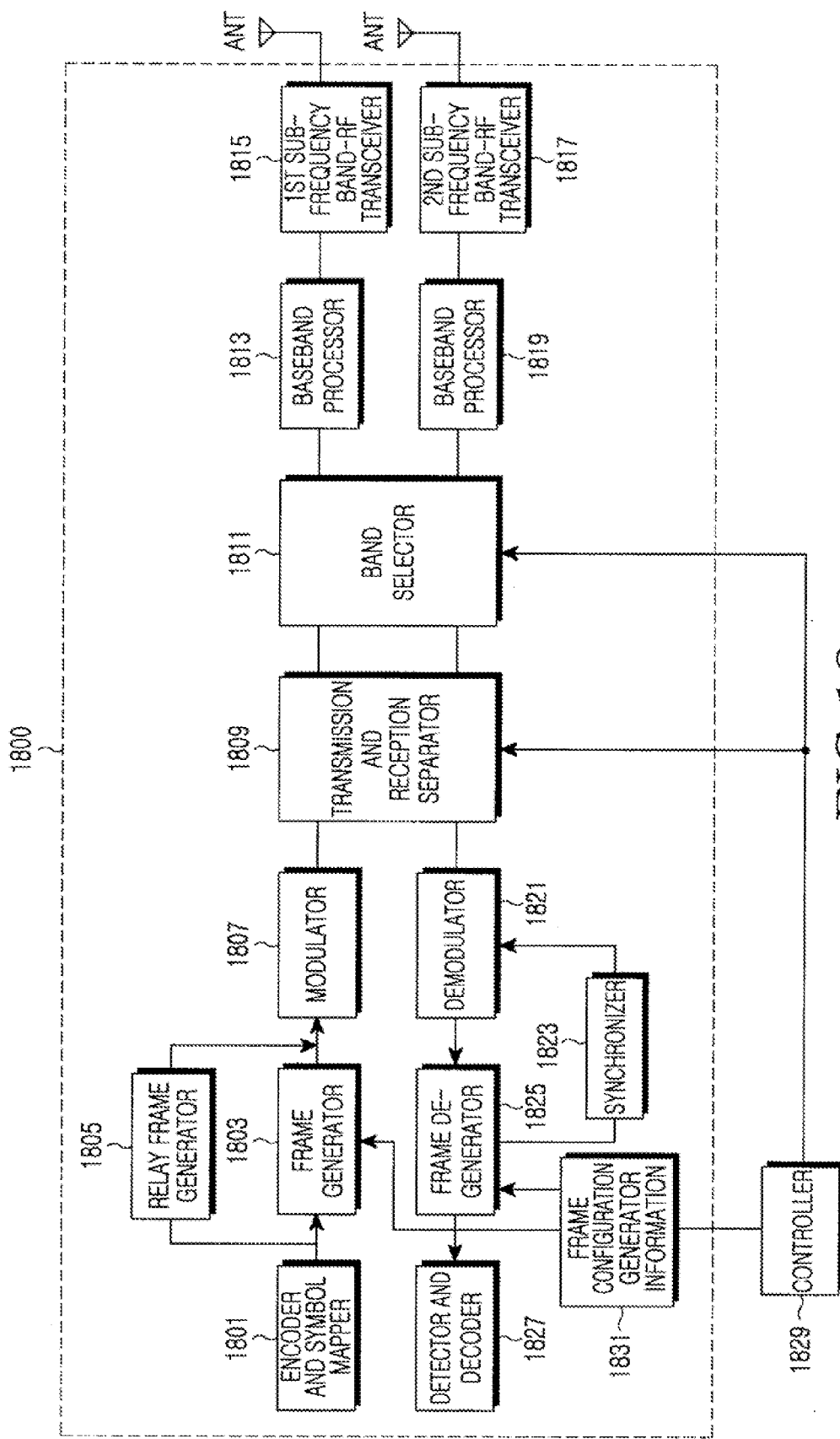
FIG. 18 is a block diagram of an RS in a communication system according to an exemplary embodiment of the present invention.

With reference to FIG. 18, a configuration of an RS in a communication system according to an exemplary embodiment of the present invention will be described.

FIG. 18 is a block diagram of an RS in a communication system according to an exemplary embodiment of the present invention.

Referring to FIG. 18, an RS 1800 includes an encoder and symbol mapper 1801, a frame generator 1803, a relay frame generator 1805, a modulator 1807, a transmission and reception separator 1809, a band selector 1811, baseband processor 1813 and 1819, a first sub-frequency band-RF transceiver 1815, a second sub-frequency band-RF transceiver 1817, a demodulator 1821, a synchronizer 1823, a frame de-generator 1825, a detector and decoder 1827, a controller 1829, and a frame configuration information processor 1831.

The encoder and symbol mapper 1801 encodes data, a control signal, and a pilot/preamble signal to be transmitted in a preset coding scheme and maps the coded data.

The frame generator 1803 configures a frame with the data, the control signal, and the pilot/preamble signal based on frame configuration information received from the controller 1829 and the frame configuration information processor 1831 and provides the frame to the modulator 1807.

The relay frame generator 1805 detects and combines a DL signal transmitted from the BS to an MS and a UL signal transmitted from the MS to the BS and provides the combined signal to the modulator 1807.

The modulator 1807 modulates the frame in a preset modulation scheme and configures transmission symbols through a pulse shaping filter.

The transmission and reception separator 1809 determines transmission slots and reception slots in each sub-frequency band for signal transmission/reception to/from an MS or a BS according to transmission and reception timing information received from the controller 1829 and outputs the transmission and reception slots to the band selector 1811. The transmission and reception separator 1809 also outputs transmission symbols received from the modulator 1807 to the band selector 1811 or a signal received from the band selector 1811 to the demodulator 1821 according to the transmission and reception timing information.

The band selector 1811 selects a sub-frequency band in which to transmit the transmission symbols according to path information received from the controller 1829 and the transmission and reception slots of each sub-frequency band received from the transmission and reception separator 1809 and outputs the transmission symbols received from the transmission and reception separator 809 to one of the baseband processors 1813 and 1819 according to the selected sub-frequency band. The band selector 1811 also outputs signals received from the baseband processors 1813 and 1819 to the transmission and reception separator 1809. The afore-described first, second and third duplexing schemes are determined based on the sub-frequency band and the time slots decided by the band selector 1811 and the transmission and reception separator 1809.

A signal output from the band selector 1811 in the determined sub-frequency band is transmitted to the MS or the BS through the baseband processor 1813 and the first sub-frequency band-RF transceiver 1815 or through the baseband processor 1819 and the second sub-frequency band-RF transceiver 1817.

A signal received from the MS or the BS is provided to the demodulator 1821 after processing in the first or second frequency band-RF transceiver 1815 or 1817, the baseband processor 1813 or 1819, the band selector 1811, and the transmission and reception separator 1809.

The demodulator 1821 demodulates the received signal in a demodulation scheme corresponding to a preset modulation scheme and the frame de-generator 1825 separates the demodulated signal into a control signal and data and provides a pilot and preamble signal of the received signal to the synchronizer 1823.

The synchronizer 1823 performs channel estimation with respect to the BS or the MS and acquires system synchronization using the pilot/preamble signal.

The detector and decoder 1825 decodes the data and the control signal received from the frame de-generator 1825 in a decoding scheme corresponding to a preset coding scheme.

The controller 1829 controls the frame generator 1803 and the frame de-generator 1825 based on channel state information received from the BS or the MS, position information about the BS and the MS for communications, and position information of the RS and provides the transmission and reception timing information and the path information for deciding the first, second and third duplexing schemes to the transmission and reception separator 1809 and the band selector 1811.

Figure 19:
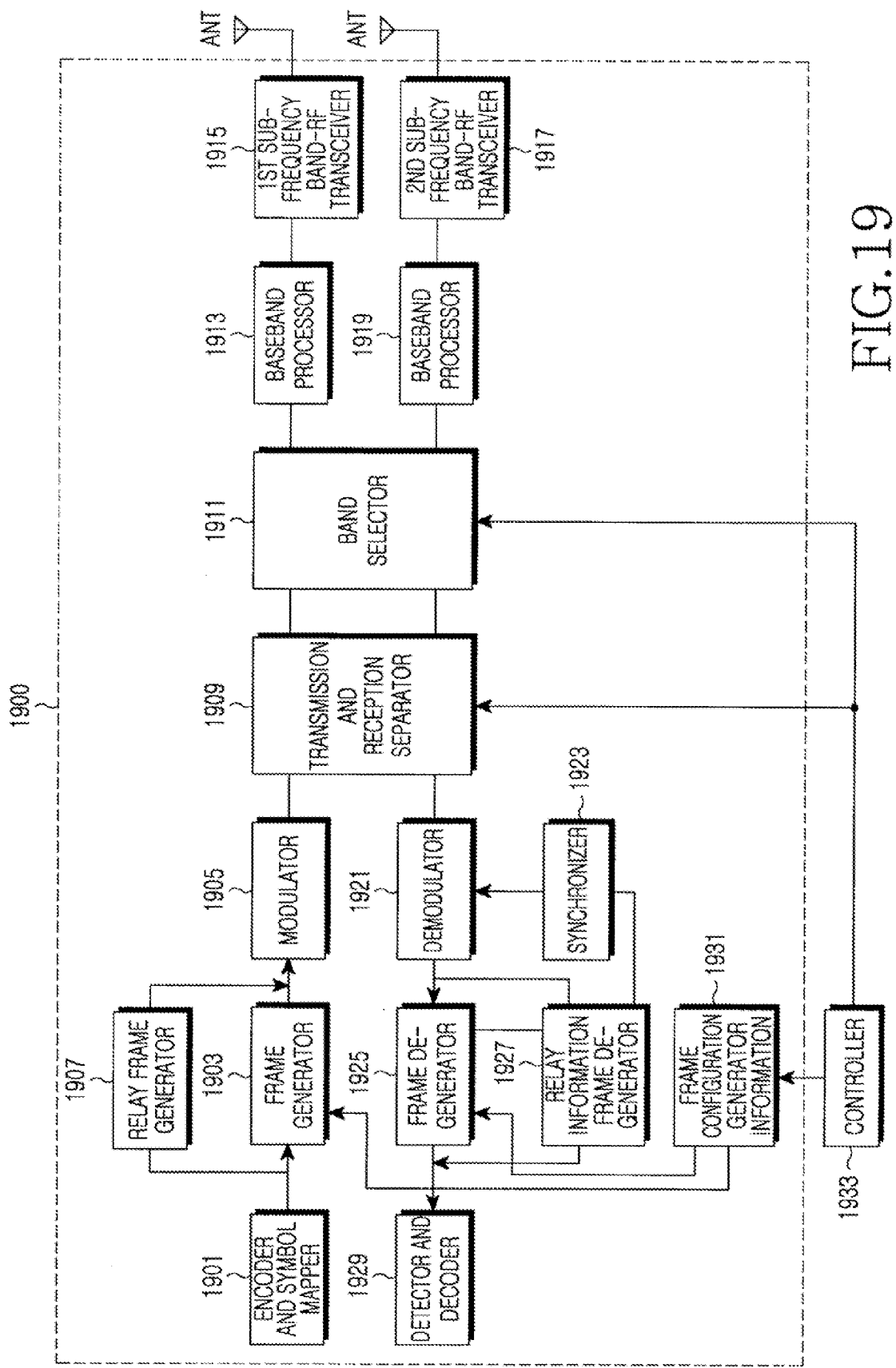
FIG. 19 is a block diagram of an MS in a communication system according to an exemplary embodiment of the present invention.

With reference to FIG. 19, a configuration of an MS in a communication system according to an exemplary embodiment of the present invention will be described.

FIG. 19 is a block diagram of an MS in a communication system according to an exemplary embodiment of the present invention.

Referring to FIG. 19, an MS 1900 includes an encoder and symbol mapper 1901, a frame generator 1903, a modulator 1905, a relay frame generator 1907, a transmission and reception separator 1909, a band selector 1911, baseband processors 1913 and 1919, a first sub-frequency band-RF transceiver 1915, a second sub-frequency band-RF transceiver 1917, a demodulator 1921, a synchronizer 1923, a frame de-generator 1925, a relay information frame de-generator 1927, a detector and decoder 1929, a frame configuration information processor 1931, and a controller 1933.

The encoder and symbol mapper 1901 encodes data, a control signal, and a UL sounding signal to be transmitted in a preset coding scheme, maps the coded data, and provides the mapped data to the frame generator 1903.

The frame generator 1903 configures a frame with the data and the control signal based on frame configuration information received from the controller 1933 and the frame configuration information processor 1931 and provides the frame to the modulator 1905.

The modulator 1905 modulates the frame in a preset modulation scheme, configures transmission symbols through a pulse shaping filter, and provides the transmission symbols to the transmission and reception separator 1909.

The relay frame generator 1907 configures a frame using data and a control signal to be transmitted to the RS according to the frame configuration information and outputs the frame to the modulator 1905.

The transmission and reception separator 1909 determines transmission slots and reception slots in each sub-frequency band for signal transmission/reception to/from an RS or a BS according to transmission and reception timing information received from the controller 1933 and outputs the transmission and reception slots to the band selector 1911. The transmission and reception separator 1909 also outputs transmission symbols received from the modulator 1905 to the band selector 1911 or a signal received from the band selector 1911 to the demodulator 1921 according to the transmission and reception timing information.

The band selector 1911 selects a sub-frequency band in which to transmit the transmission symbols according to path information received from the controller 1933 and the transmission and reception slots of each sub-frequency band received from the transmission and reception separator 1909 and outputs the transmission symbols received from the transmission and reception separator 809 to one of the baseband processors 1913 and 1919 according to the selected sub-frequency band. The band selector 1911 also outputs signals received from the baseband processors 1913 and 1919 to the transmission and reception separator 1909. The afore-described first, second and third duplexing schemes are determined based on the sub-frequency band and the time slots decided by the band selector 1911 and the transmission and reception separator 1909.

A signal output from the band selector 1911 in the determined sub-frequency band is transmitted to the RS or the BS through the baseband processor 1913 and the first sub-frequency band-RF transceiver 1915 or through the baseband processor 1919 and the second sub-frequency band-RF transceiver 1917.

A signal received from the RS or the BS is provided to the demodulator 1921 after processing in the first or second frequency band-RF transceiver 1915 or 1917, the baseband processor 1913 or 1919, the band selector 1911, and the transmission and reception separator 1909.

The demodulator 1921 demodulates the received signal in a demodulation scheme corresponding to a preset modulation scheme and the frame de-generator 1925 separates the demodulated signal into a control signal and data and provides a pilot and preamble signal of the received signal to the synchronizer 1923.

The synchronizer 1923 performs channel estimation with respect to the BS or the RS and acquires system synchronization using the pilot/preamble signal.

The detector and decoder 1929 decodes the data and the control signal received from the frame de-generator 1925 in a decoding scheme corresponding to a preset coding scheme.

The relay information frame de-generator 1927 eliminates a signal transmitted by the MS from a signal received from the RS and decodes the resulting signal. The relay information frame de-generator 1927 is related to a network coding technique, which will not be described in detail herein.

The controller 1933 controls the frame generator 1903 and the frame de-generator 1925 based on channel state information received from the BS or the RS, position information about the BS and the RS for communications, and position information of the MS and provides the transmission and reception timing information and the path information for deciding the first, second and third duplexing schemes to the transmission and reception separator 1909 and the band selector 1911.

As is apparent from the above description, exemplary embodiments of the present invention advantageously minimizes inter-cell interference and increases frequency use efficiency by applying a variety of duplexing schemes to each link, taking into account the positions and channel states of an MS, a BS and an RS and applying a frequency reuse scheme to an inner cell area and an outer cell area in a communication system using RSs.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A system for transmitting and receiving signals in a communication system, the system comprising:
   a Base Station (BS) for communicating with a first Mobile Station (MS) located within an inner area of a cell during first and second time periods in Time Division Duplexing (TDD) and for communicating with a second MS located within an outer area of the cell during the first time period in Frequency Division Duplexing (FDD); and
   a Relay Station (RS) for detecting signals transmitted between the BS and the second MS during the first time period and for transmitting the detected signals simultaneously to the BS and the second MS during the second time period,
   wherein the RS detects a first signal transmitted from the BS to the second MS and a second signal transmitted from the second MS to the BS during the first time period, combines the first signal with the second signal, and transmits the combined signal to the BS and the second MS during the second time period.

2. The system of claim 1, wherein the BS controls the size of the inner area of the cell and transmission powers for the first MS and the second MS to satisfy reception Signal-to-Noise Ratios (SNRs) requested by the first MS and the second MS.

3. The system of claim 1, wherein the BS controls transmission powers for the first MS and the second MS to satisfy a reception SNR requested by the second MS.

4. The system of claim 1, wherein the BS controls the size of the inner area of the cell to satisfy a reception SNR requested by the first MS.

5. The system of claim 1, wherein the BS communicates with the first MS and second MS using one of a Reuse Partitioning (RP) based duplexing scheme and Partial Frequency Reuse (PFR) based duplexing scheme.

6. A system for transmitting and receiving signals in a communication system, the system comprising:
   a Base Station (BS) for communicating with a first Mobile Station (MS) located within an inner area of a cell during first and second time periods in Time Division Duplexing (TDD) and for communicating with a second MS located within an outer area of the cell during the first time period in Frequency Division Duplexing (FDD); and
   a Relay Station (RS) for detecting signals transmitted between the BS and the second MS during the first time period and for transmitting the detected signals simultaneously to the BS and the second MS during the second time period,
   wherein the BS communicates with the first MS on a first-type subchannel in one of first and second sub-frequency bands and communicates with the second MS on a second-type subchannel in a downlink subframe of the first sub-frequency band and a second-type subchannel in an uplink subframe of the second sub-frequency band, the first-type including a plurality of successive subcarriers along a frequency axis and the second-type subchannels each including a plurality of scattered subcarriers along the frequency axis.

7. The system of claim 6, wherein the RS detects the signals transmitted between the BS and the second MS on the second-type subchannel in the downlink subframe of the first sub-frequency band and on the second-type subchannel in the uplink frame of the second sub-frequency band.

8. The system of claim 7, wherein the RS transmits the detected signals on one of a second-type subchannel in the uplink subframe of the first sub-frequency band and a second-type subchannel in the uplink subframe of the second sub-frequency band.

9. A method for transmitting and receiving signals in a communication system, the method comprising:
   communicating, by a Base Station (BS), with a first Mobile Station (MS) located within an inner area of a cell during first and second time periods in Time Division Duplexing (TDD);
   communicating, by the BS, with a second MS located within an outer area of the cell during the first time period in Frequency Division Duplexing (FDD);
   detecting, by a Relay Station (RS), signals transmitted between the BS and the second MS during the first time period; and
   transmitting, by the RS, the detected signals simultaneously to the BS and the second MS during the second time period, the transmitting including
      detecting a first signal transmitted from the BS to the second MS and a second signal transmitted from the second MS to the BS during the first time period;
      combining the first signal with the second signal; and
      transmitting the combined signal to the BS and the second MS during the second time period.

10. The method of claim 9, further comprising controlling, by the BS, the size of the inner area of the cell and transmission powers for the first MS and the second MS to satisfy reception Signal-to-Noise Ratios (SNRs) requested by the first MS and the second MS.

11. The method of claim 9, further comprising controlling, by the BS, transmission powers for the first MS and the second MS to satisfy a reception SNR requested by the second MS.

12. The method of claim 9, further comprising controlling, by the BS, the size of the inner area of the cell to satisfy a reception SNR requested by the first MS.

13. The method of claim 9, wherein the BS communicates with the first MS and second MS using one of a Reuse Partitioning (RP) based duplexing scheme and Partial Frequency Reuse (PFR) based duplexing scheme.

14. A method for transmitting and receiving signals in a communication system, the method comprising:
   communicating, by a Base Station (BS), with a first Mobile Station (MS) located within an inner area of a cell during first and second time periods in Time Division Duplexing (TDD);
   communicating, by the BS, with a second MS located within an outer area of the cell during the first time period in Frequency Division Duplexing (FDD);
   detecting, by a Relay Station (RS), signals transmitted between the BS and the second MS during the first time period; and
   transmitting, by the RS, the detected signals simultaneously to the BS and the second MS during the second time period,
   wherein the communicating with the first MS comprises communicating with the first MS on a first-type subchannel in one of first and second sub-frequency bands, and wherein the communicating with the second MS comprises communicating with the second MS on a second-type subchannel in a downlink subframe of the first sub-frequency band and a second-type subchannel in an uplink subframe of the second sub-frequency band, the first-type including a plurality of successive subcarriers along a frequency axis and the second-type subchannels each including a plurality of scattered subcarriers along the frequency axis.

15. The method of claim 14, further comprising detecting, by the RS, signals transmitted between the BS and the second MS on the second-type subchannel in the downlink subframe of the first sub-frequency band and on the second-type subchannel in the uplink frame of the second sub-frequency band.

16. The method of claim 15, further comprising transmitting, by the RS, the detected signals on one of a second-type subchannel in the uplink subframe of the first sub-frequency band and a second-type subchannel in the uplink subframe of the second sub-frequency band.

* * * * *